United States Patent
Yi et al.

(10) Patent No.: US 10,212,678 B2
(45) Date of Patent: Feb. 19, 2019

(54) METHOD AND APPARATUS FOR NETWORK SYNCHRONIZATION

(71) Applicant: LG ELECTRONICS INC., Seoul (KR)

(72) Inventors: Yunjung Yi, Seoul (KR); Joonkui Ahn, Seoul (KR); Byounghoon Kim, Seoul (KR); Hanbyul Seo, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/033,863

(22) PCT Filed: Nov. 20, 2014

(86) PCT No.: PCT/KR2014/011203
§ 371 (c)(1),
(2) Date: May 2, 2016

(87) PCT Pub. No.: WO2015/076587
PCT Pub. Date: May 28, 2015

(65) Prior Publication Data
US 2016/0278030 A1  Sep. 22, 2016

Related U.S. Application Data

(60) Provisional application No. 61/906,879, filed on Nov. 20, 2013, provisional application No. 61/928,427, (Continued)

(51) Int. Cl.
*H04J 3/06* (2006.01)
*H04W 56/00* (2009.01)
(Continued)

(52) U.S. Cl.
CPC ...... *H04W 56/0015* (2013.01); *H04B 7/0413* (2013.01); *H04L 5/001* (2013.01);
(Continued)

(58) Field of Classification Search
CPC . H04W 56/0015; H04W 16/32; H04W 56/00; H04W 56/001; H04W 72/1263;
(Continued)

(56) References Cited

U.S. PATENT DOCUMENTS

2008/0240073 A1  10/2008  Pun et al.
2009/0122782 A1  5/2009  Horn et al.
(Continued)

FOREIGN PATENT DOCUMENTS

| CN | 102379143 | 3/2012 |
|---|---|---|
| CN | 102577547 | 7/2012 |
| WO | 2013/166193 A1 | 11/2013 |

OTHER PUBLICATIONS

Huawei: "Radio-interface based synchronization mechanisms", R1-132893, XP050716138, 3GPP TSG RAN WG1 Meeting #74, Barcelona, Spain, Aug. 19-23, 2013.
(Continued)

*Primary Examiner* — Kwang B Yao
*Assistant Examiner* — Hardikkumar D Patel
(74) *Attorney, Agent, or Firm* — Dentons US LLP

(57) ABSTRACT

A method and an apparatus for network synchronization based on network listening are provided. The method comprises receiving signal for synchronization to other cell, performing synchronization to other cell based on a reference signal for synchronization, and receiving and/or transmitting data at a timing based on the synchronization, wherein the reference signal for synchronization is one of CRS, CSI-RS, PSS and/or SSS, DM-RS, and MBSFN-RS.

14 Claims, 18 Drawing Sheets

Related U.S. Application Data filed on Jan. 17, 2014, provisional application No. 61/932,239, filed on Jan. 27, 2014, provisional application No. 61/944,047, filed on Feb. 24, 2014, provisional application No. 61/990,656, filed on May 8, 2014.

(51) Int. Cl.
*H04B 7/0413* (2017.01)
*H04L 5/00* (2006.01)
*H04W 72/12* (2009.01)
*H04W 16/32* (2009.01)
*H04W 84/04* (2009.01)

(52) U.S. Cl.
CPC ........... *H04W 16/32* (2013.01); *H04W 56/00* (2013.01); *H04W 56/001* (2013.01); *H04W 72/1263* (2013.01); *H04W 84/045* (2013.01)

(58) Field of Classification Search
CPC ... H04W 84/045; H04W 24/02; H04W 16/24; H04W 48/08; H04W 72/04; H04W 74/08; H04W 24/10; H04W 72/0446; H04B 7/0413; H04B 7/02; H04L 5/001; H04L 29/12; H04L 27/26
See application file for complete search history.

(56) References Cited

U.S. PATENT DOCUMENTS

| | | | |
|---|---|---|---|
| 2010/0074180 A1 | 3/2010 | Palanki | |
| 2010/0110983 A1 | 5/2010 | Fu | |
| 2010/0260168 A1* | 10/2010 | Gheorghiu | H04W 56/0015 370/350 |
| 2011/0110475 A1 | 5/2011 | Fourcand | |
| 2012/0224533 A1* | 9/2012 | Lin | H04W 56/002 370/328 |
| 2013/0136057 A1* | 5/2013 | Skov | H04J 3/0638 370/328 |
| 2013/0310048 A1* | 11/2013 | Hunukumbure | H04W 52/0206 455/443 |
| 2014/0226541 A1 | 8/2014 | Xu | |
| 2014/0233524 A1* | 8/2014 | Jang | H04W 74/0833 370/329 |
| 2014/0241225 A1* | 8/2014 | Novak | H04W 72/02 370/311 |
| 2015/0327043 A1 | 11/2015 | Das | |
| 2016/0165560 A1 | 6/2016 | Takeda | |

OTHER PUBLICATIONS

3GPP TR 36.922 V9.1.0, "TDD Home eNode B (HeNB) Radio Frequency (RF) requirements analysis (Release 9)", XP055170278, Jun. 1, 2010.

* cited by examiner

METHOD AND APPARATUS FOR NETWORK SYNCHRONIZATION

This application is a National Stage Application of International Application No. PCT/KR2014/011203, filed on Nov. 20, 2014, which claims the benefit of U.S. Provisional Application No. 61/906,879, filed on Nov. 20, 2013, U.S. Provisional Application No. 61/928,427, filed on Jan. 17, 2014, U.S. Provisional Application No. 61/932,239, filed on Jan. 27, 2014, U.S. Provisional Application No. 61/944,047, filed on Feb. 24, 2014 and U.S. Provisional Application No. 61/990,656, filed on May 8, 2014, all of which are hereby incorporated by reference in their entirety for all purposes as if fully set forth herein.

TECHNICAL FIELD

This invention relates to wireless communication, more specifically to network synchronization mechanism in small cell scenarios.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

Recently, in addition to carriers in licensed band, carriers in unlicensed band are also considered for carrier aggregation. In this case, a UE can be configured with zero or more carriers in licensed band and zero or more carriers in unlicensed band. Due to its nature of unlicensed band where the medium is shared by multiple devices and thus continuous transmission is not easily feasible, it is very natural to assume that discontinuous transmission from an eNB operating in unlicensed band. The inventions embodied in this application are applied to carriers in unlicensed band A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

Meanwhile, the usage of small cell is getting grown in many fields nowadays, such as pico cells, small cells under dual connectivity, etc. In these many cases, concerning synchronize between cells also become to be an issue.

SUMMARY OF INVENTION

Technical Problem

An object of the present invention is to provide method and apparatus for network synchronization by network listening in small cell scenarios. Another object of the present invention is to provide method and apparatus for network synchronization using reference signal besides synchronization signal among cells.

Yet another object of the present invention is to provide method and apparatus for network synchronization considering stratum level of reference signal.

Technical Solution

An embodiment of the present invention is a method of performing synchronization by a cell based on network listening which comprises receiving signal for synchronization to other cell, performing synchronization to other cell based on a reference signal for synchronization and receiving and/or transmitting data at a timing based on the synchronization, wherein the reference signal for synchronization is one of cell-specific common reference signal (CRS), channel-state information reference signal (CSI-RS), synchronization signal (PSS) and/or secondary synchronization signal (SSS), demodulation reference signal (DM-RS), and multimedia broadcast single frequency network reference signal (MBSFN-RS).

Another embodiment of the present invention is an apparatus of performing synchronization based on network listening which comprises a radio frequency (RF) unit for transmitting and receiving a radio signal, and a processor operatively coupled to the RF unit, wherein the processor is configured for transmitting signals via the RF unit based on a scheduling for UL and/or DL, wherein the processor performs synchronization to other cell based on a reference signal for synchronization and, the RF unit receives and/or transmits data at a timing based on the synchronization, wherein the reference signal for synchronization is one of cell-specific common reference signal (CRS), channel-state information reference signal (CSI-RS), synchronization signal (PSS) and/or secondary synchronization signal (SSS), demodulation reference signal (DM-RS), and multimedia broadcast single frequency network reference signal (MBSFN-RS).

Advantageous Effects

According to the present invention, the cell under intra-operator capable for backhaul signaling can synchronize to other cell effectively using not only synchronization signal but also reference signal.

According to the present invention, the cell can synchronize to other cell with reduced interference between neighboring cells.

According to the present invention, the cell can synchronize to other cell considering stratum level in order to secure accuracy.

MODE FOR INVENTION

Figure 1:
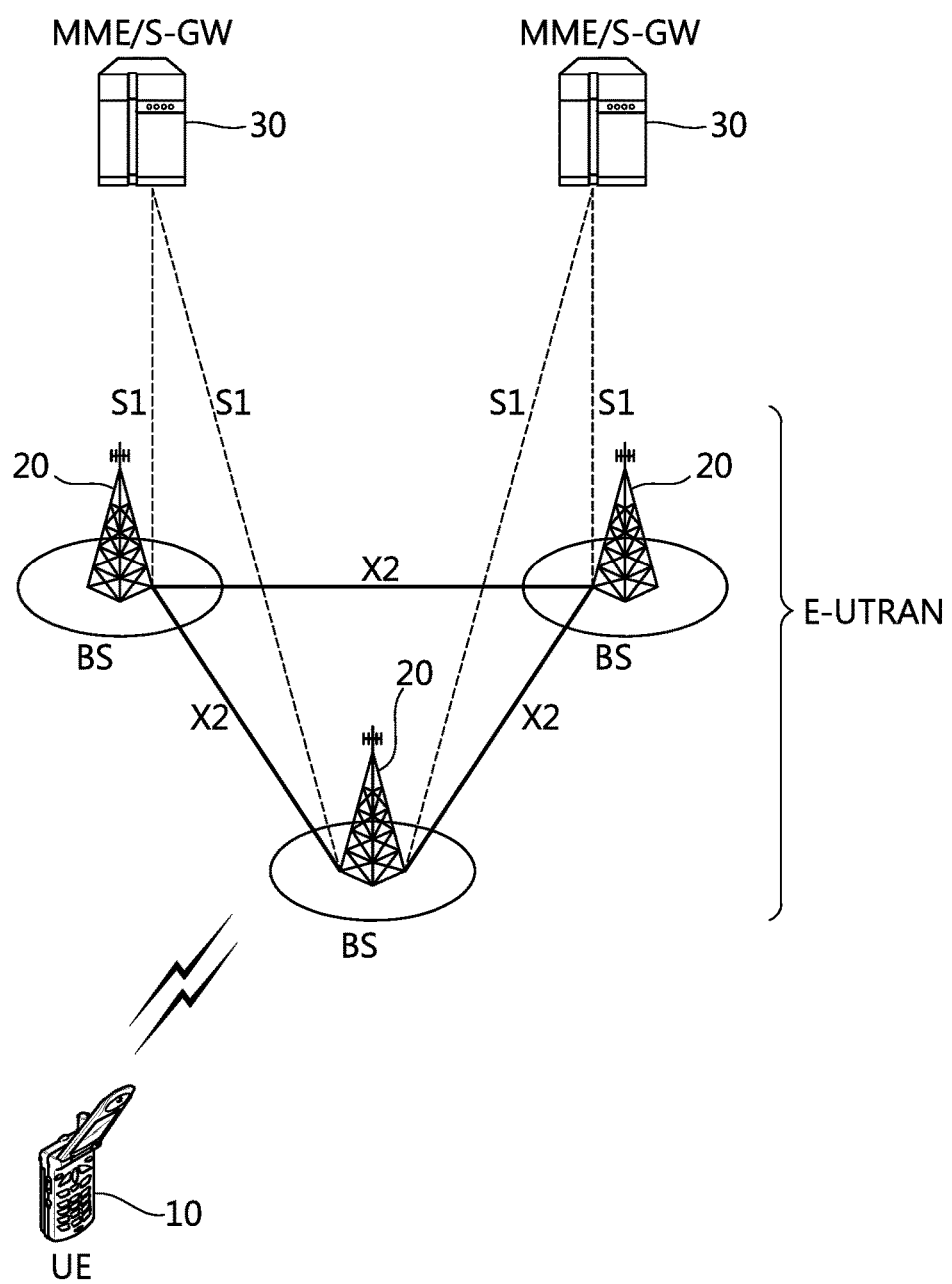
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
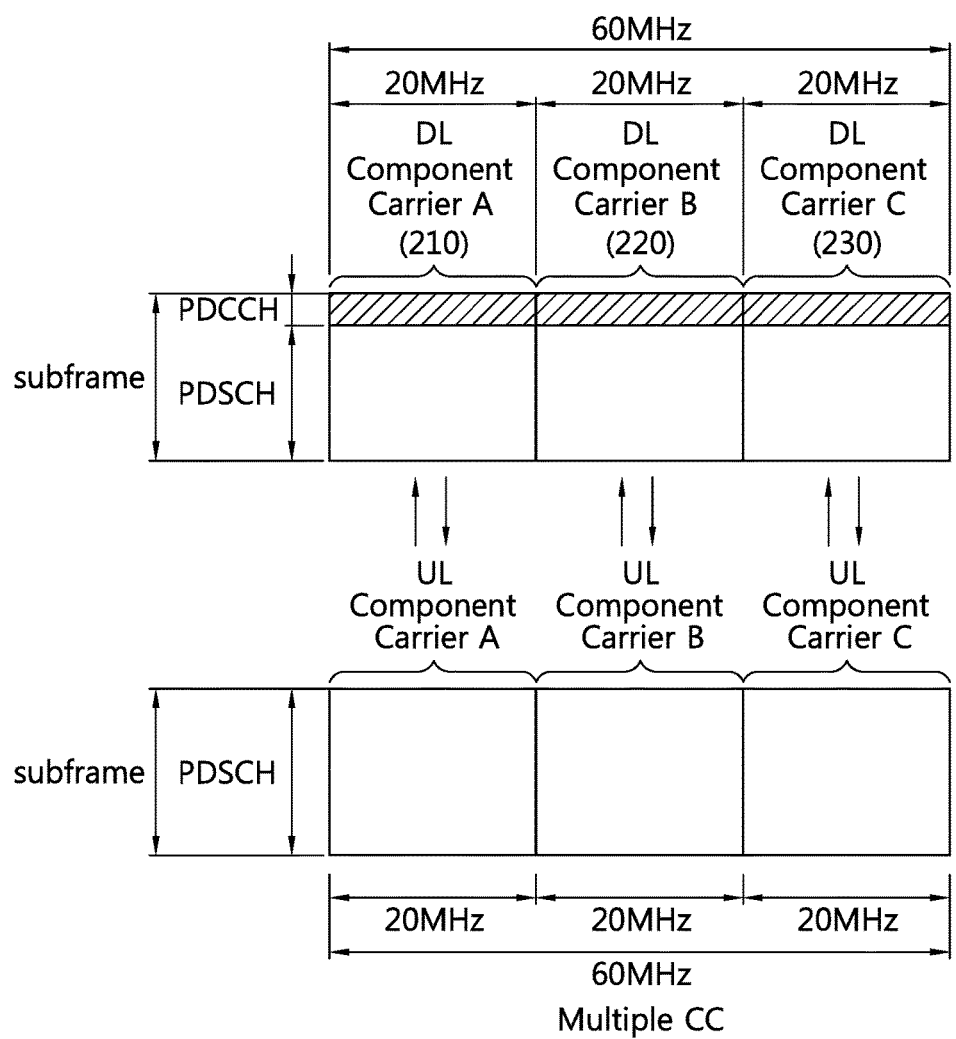
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report channel-quality indicator (CQI)/precoding matrix indicator (PMI)/rank indicator (RD/procedure transaction identifier (PTI) for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
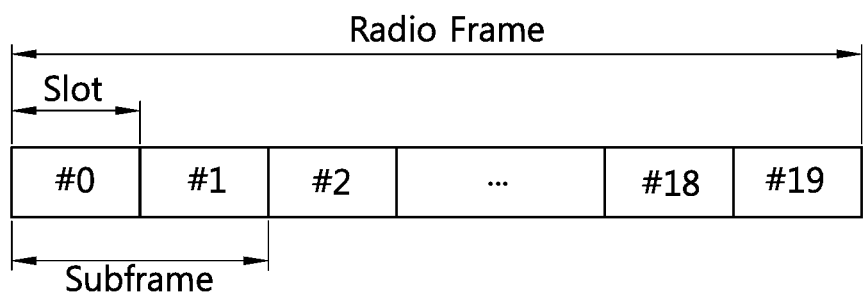
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CaI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Figure 4:
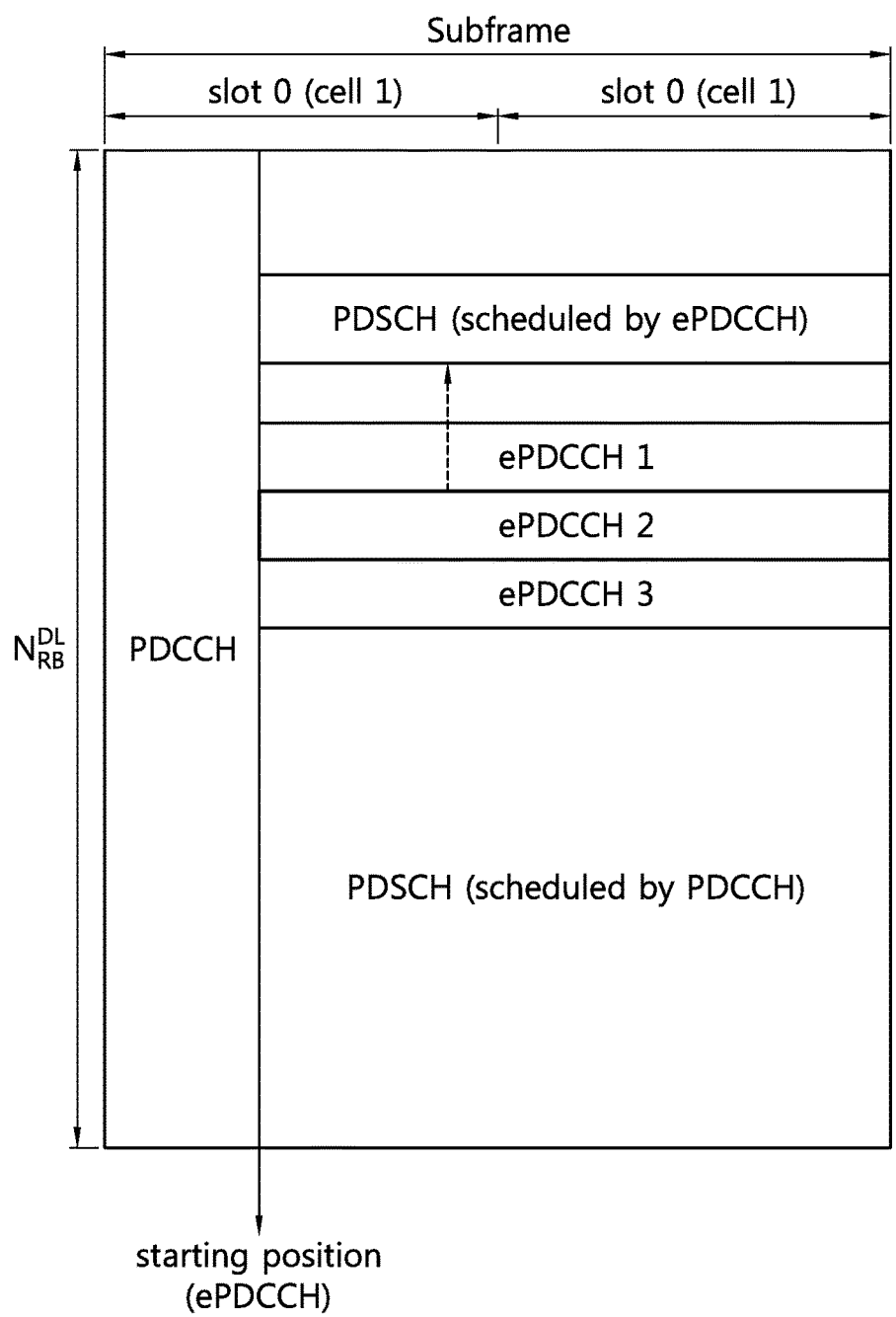
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific reference signal (CRS) may be omitted in some subframes or physical broadcast channel (PBCH) may not be transmitted.

Figure 5:
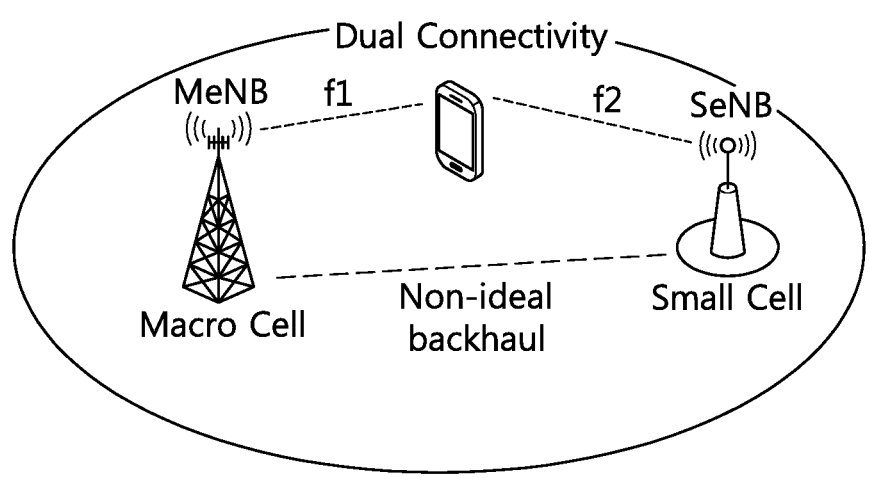
FIG. 5 shows an example of dual connectivity to a macro cell and a small cell.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

Figure 6:
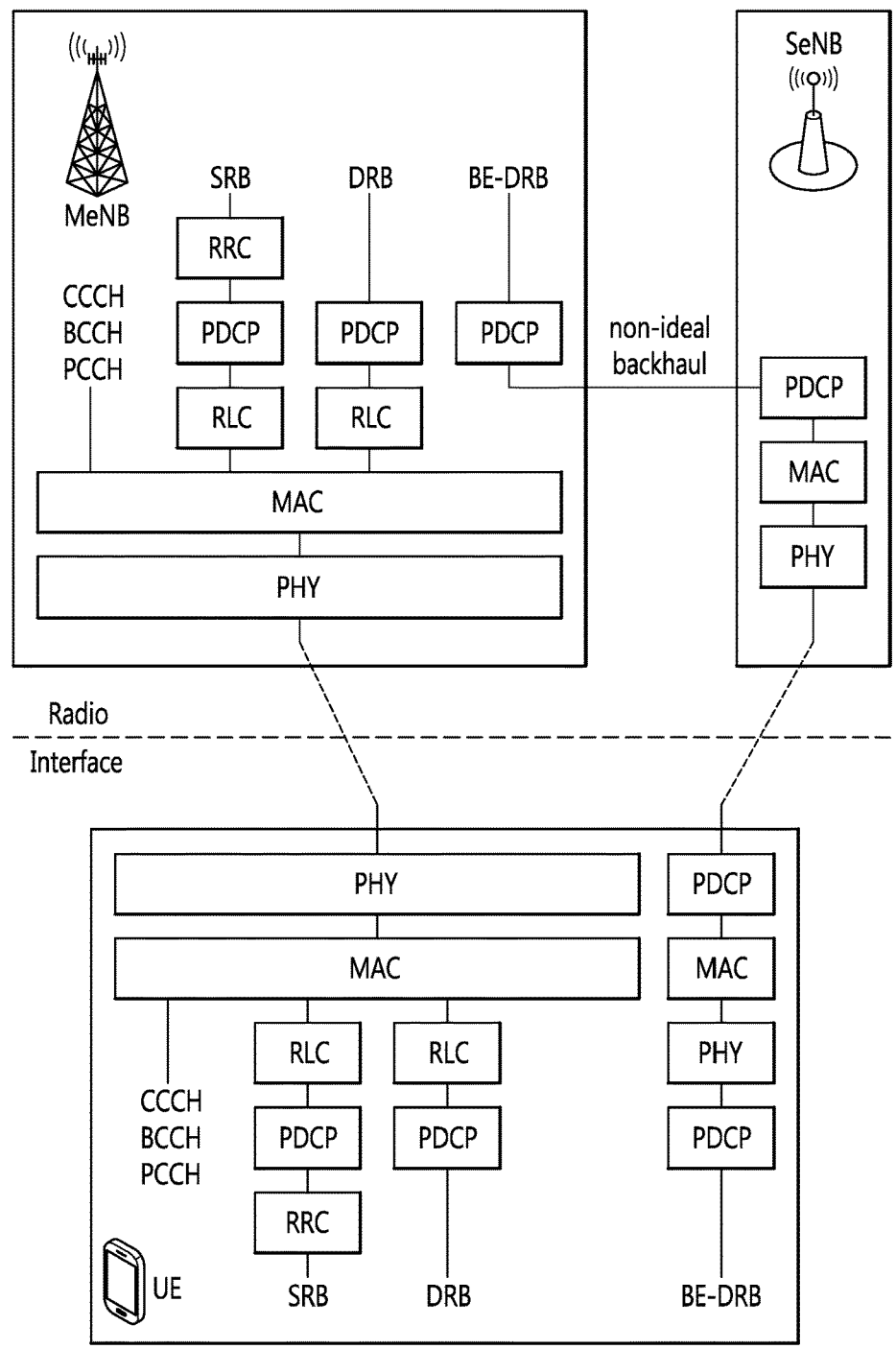
FIG. 6 shows an example of a protocol architecture supporting dual connectivity.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Meanwhile, network listening is a useful technique which can be utilized when other techniques such as GPS or IEEE 1588v2 are not available.

Inventions in disclosure reviews a set of scenarios where network listening may be applied and propose enhancement in backhaul signaling to support efficient network listening mechanisms.

For example, the invention(s) in this disclosure focuses on coordinated muting technique using MBSFN subframe as described in 3GPP TR 36.922. An example of coordinated muting/transmission pattern is shown in below. In coordinated muting, following a pattern, each small cell transmits RS for network listening and others will do muting to reduce interference.

The invention(s) in this disclosure also focuses on time synchronization aspect. Yet, the techniques proposed in this invention can be applicable for frequency synchronization as well.

Hereinafter, detailed descriptions for the invention(s) relating to the network listening are provided with figures. Reference Signal (RS) Candidates Used for Network Listening When coordinated muting is applied, in terms of transmitting RS for network listening and perform muting may be realized in two approaches.

In first approach, only muting is concerned i.e., eNBs may perform muting of RS transmission which otherwise may interfere the RS transmission from the transmitters for network synchronization for a given stratum level and transmitter may transmit regular signals which can be read by UEs and other eNBs at the same time.

The stratum level can be used by other nodes to calculate its timing accuracy compared to the clock source. Alternatively, stratum level may be used for indicating accuracy level as well. For example, accuracy level 3 maps to stratum level 3 and accuracy level 2 maps to stratum level 2 and so on. Thus, the lower stratum level may have the more accuracy. In addition, the cell with high stratum level may listen to RS of the cell with low stratum level. For example, the cell with k-th stratum level (k is integer and 0≤k) may perform network synchronization with RS transmitted from a cell with (k−1)-th stratum level.

How to determine stratum level may be up to eNB implementation. Yet, the mapping table where each eNB can assume in terms of synchronization error achievable needs to be specified. This specification is necessary to determine the state of synchronous or asynchronous if there is a target requirement to meet. Table 1 is an example of accuracy mapping table.

TABLE 1

| Accuracy Level | |
|---|---|
| 0 | Clock source (less than ~100 ns) Synchronous |
| 1 | Accuracy within ±1 us Synchronous |
| 2 | Accuracy within ±1.5 us Synchronous |
| 3 | Accuracy within ±3 us Synchronous |
| 4 | Accuracy within ±6 us Asynchronous |
| 5 | Accuracy within >= ±10 us Asynchronous |

The other approach is to determine both transmission and reception occurrence by the muting/transmission pattern. In other words, based on a pattern, each eNB will perform transmission and reception regardless of whether the transmitted signals may be read by UEs or not. In this case, each synchronization source and target may determine its own transmission and muting pattern which can be exchanged via backhaul signaling. For example, source eNB may indicate the set of subframes and/or period/offset of synchronization signal transmission which can be informed to the target eNB via backhaul signaling.

Figure 7:
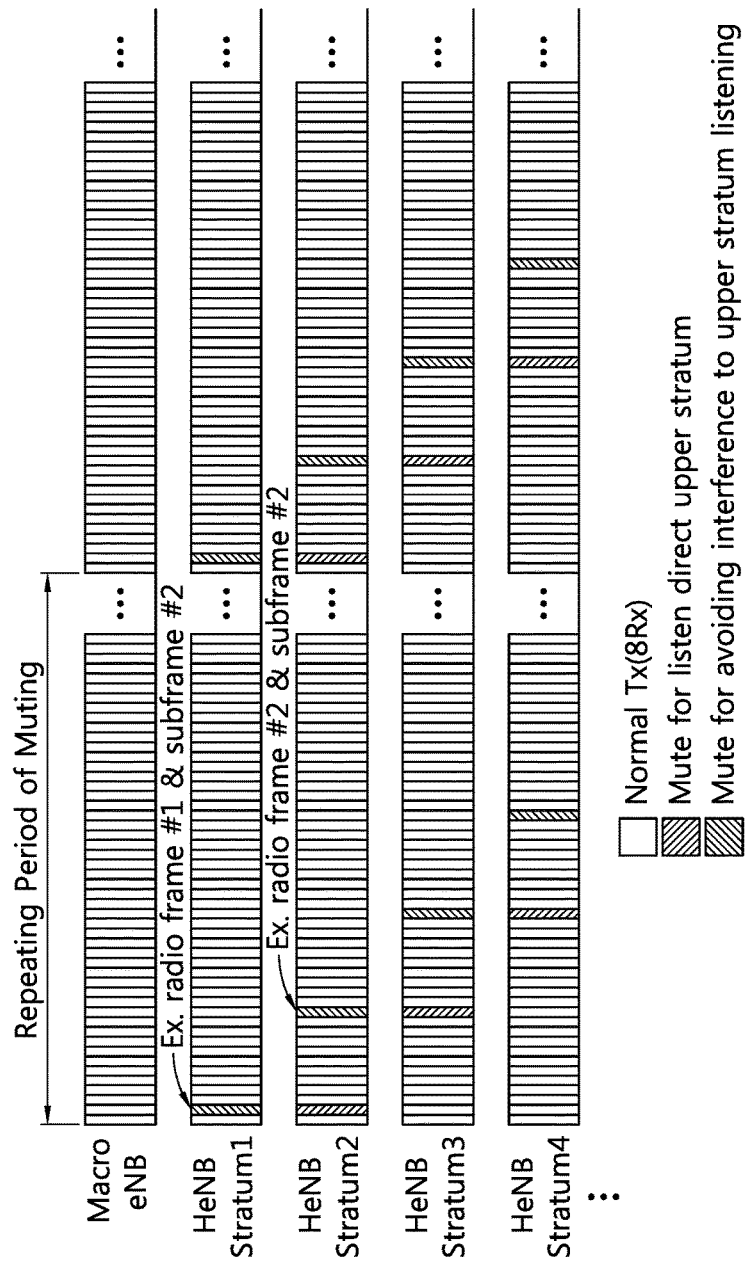
FIG. 7 briefly describes an example of muting pattern per stratum level.

FIG. 7 briefly describes an example of muting pattern per stratum level. Referring to the FIG. 7, each stratum has its own pattern or muting timing. A set of eNBs may use the same muting pattern if it has the same stratum level.

One example of second approach is to configure both subframes for transmission and reception (transmission and muting places) as MBSFN subframes or uplink subframes to minimize the impact on UEs. To allow flexibility, it may be assumed that RS transmitted in OFDM symbols except for first two OFDM symbols (to allow PDCCH transmission in MBSFN subframes) are used for network listening. Different scrambling or sequence, if transmitted in MBSFN or uplink subframes, for synchronization RS may be feasible as well.

One example of the second approach is to use the same ID to scramble the RS per stratum-level. In other words, RS transmitted from eNBs with stratum level 1 may use the same ID as well as the same location (i.e., SFN transmission of RS) to further enhance the performance.

The ID and/or resource configurations used for each stratum level may be preconfigured via Operations and Maintenance (OAM) or configured by macro cell or controlling eNB. In addition to CRS, channel-state information reference signal (CSI-RS) or primary synchronization signal (PSS)/secondary synchronization signal (SSS) or PSS or SSS or PRA (Positioning RS) may be considered if second approach is used.

Even with first approach, synchronization may be performed based on any available signals at the transmission places. For example, if transmission occurs in subframe #0, in addition to CRS, PSS/SSS may be also usable for network listening. Furthermore, which RS(s) can be used for synchronization can be indicated via backhaul signaling. One example is to use PSS/SSS+CRS or CRS+PRS.

In either approach, the following candidates using existing signals or combinations of existing signals can be considered such as (1)~(5) as below.

(1) CRS: CRS can be used for channel estimation for coherent demodulation of downlink physical channel. If CRS is used for network listening RS, depending on MBSFN subframe configuration of transmitter eNB, the transmitting subframe may carry CRS in first two OFDM symbols or the entire subframe. In first two OFDM symbols, however, other eNBs may not be able to mute as it needs to transmit PDCCH in MBSFN subframes configured for muting places (unless the subframe is configured as uplink subframe). With this point, hearing ability of CRS in first two OFDM symbols even with coordinated muting may not be desirable. Thus, it would be better to consider CRS transmission in OFDM symbols other than first two OFDM symbols.

If the subframe is normal subframe and eNB transmits CRS in that subframe, this can be achieved without any additional support. If the subframe is however configured as MBSFN subframe, CRS needs to be transmitted in PDSCH region or MBMS region.

(2) CSI-RS: Another RS can be used for network listening is CSI-RS. CSI-RS may be used to acquire channel-state information (CSI). For example, CSI-RS can be used to acquire CSI in the case when DM-RS is used for channel estimation. To allow large interval between synchronization RS transmission occurrences, a new configuration with larger gap may be necessary.

(3) Primary synchronization signal (PSS) and/or secondary synchronization signal (SSS): To avoid potential confusion at UE side, if PSS and/or SSS are used for synchronization signal, it would be desirable to transmit either PSS or SSS. Another possible approach is to use different gap from current gap for FDD or TDD in normal/extended Cyclic Prefix between PSS and SSS transmission such that a UE cannot successfully decode both PSS and SSS.

(4) demodulation reference signal (DM-RS): DM-RS may be used for channel estimation for PDSCH. DM-RS can be also considered as RS for network listening.

(5) MBSFN-RS: MBSFN-RS may be used for channel estimation for coherent demodulation in the case of multicast channel transmission using MBSFN. If uplink subframe or MBSFN subframe is used for network listening, MBSFN-RS can be considered for network listening purpose.

(6) PRS: PRS can be used for synchronization as well in which case, a UE may not be known whether the network is transmitting PRS or not. To minimize the impact on UE, data scheduling may not be scheduled in that subframe where PRS for network synchronization is transmitted.

To achieve better synchronization, it is desirable to listen on PSS/SSS and CRS transmission from a source cell. Using MBSFN based coordinated muting, however, this is not easily achievable unless the cell which is listening skips transmitting of PSS/SSS/CRS at subframes of listening.

Moreover, the quality of PSS/SSS and CRS (e.g., in subframe #0) may not be good due to high interference from other cells when network synchronization is used.

Thus, it may not be desirable to listen on other cells in subframe #0/subframe #5 though listening on PSS/SSS may be useful. To mitigate this issue, one method is to transmit PSS and/or SSS in subframe used for transmitting RS for network listening and then avoid scheduling data in those region where this additional PSS and/or SSS is transmitted.

To support this, transmitter also may claim the subframe as MBSFN subframe, and then avoid scheduling of PDSCH in center 6 PRB to transmit other signals.

Depending on scenarios, the best candidate for network listening can be different. For example, if overlaid macro layer is used for network listening, CRS/PSS/SSS would be the best candidate whereas small cell is used for network listening source, CSI-RS or MBSFN-RS can be considered.

Thus, along with coordinated muting pattern, the type of RS(s) can be also configured. Or, if CSI-RS is used, the configuration of CSI-RS used for network listening may be indicated via X2 signaling or OAM. X2 signaling is signaling via backhaul.

RS Locations Used for Network Listening

Without knowing the system bandwidth, it would be reasonable to assume that RS transmitted in center 6 PRB will be used for network listening. Or, it may be assumed that listening cell may acquire the system bandwidth information of source cell and try to locate synchronization RS in the entire system bandwidth.

Particularly, if a small cell acquires synchronization RS from a neighbor small cell in the same frequency, it may be assumed that the same system bandwidth is used for all small cells in the same frequency.

This however would be effective only when synchronization RS transmitted by source cell would be used for both network listening as well as serving UEs (i.e., UEs can read RS as well).

If separate RS which may not be readable from a UE perspective is used for network listening, it would be desirable to limit the number of PRBs transmitting RS. The location of PRBs can be configurable by X2 signaling or predetermined via OAM.

Figure 8:
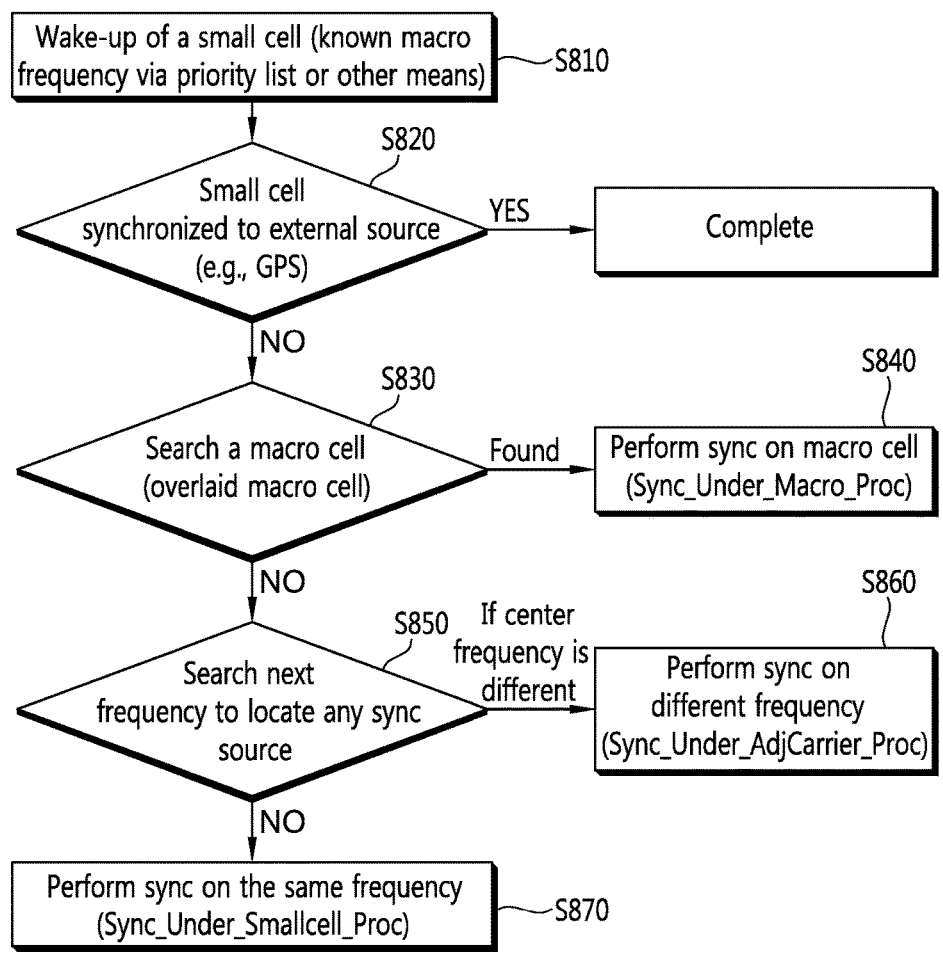
FIG. 8 is a flow chart briefly showing procedure of small cell synchronization via network listening.

In terms of a candidate procedure how network listening can work when a small cell is booted up FIG. 8 is a flow chart briefly showing procedure of small cell synchronization via network listening.

Referring to FIG. 8, a small cell wakes up with macro frequency (S810). The macro frequency is known via priority list or by other mean such as direct signaling.

When the small cell wakes up, the small cell synchronizes with external source (S820). The small cell identifies synchronization source per preconfigured priority list of frequency to look up. It may be assumed that first the small cell will search macro frequency to locate overlaid macro layer. When macro cell is detected, it can further determine whether it uses macro cell for frequency and/or time synchronization. One criteria is to use pathloss estimation to infer the expected propagation delay between macro and the small cell.

If the pathloss exceeds a certain threshold, it may consider time synchronization using macro cell may not be adequate in terms of performance. However, frequency tracking may be considered as adequate. In that case, time and frequency tracking may use separate synchronization source.

And then, necessary synchronization procedure may continue to perform time synchronization. To support this, transmission power of macro cell may be indicated to the small cells either via X2 signaling or small cell may read SIB information of macro cell.

When the small cell wakes up, the small cell first searches macro cell either via air-interface or discover macro cell via backhaul signaling (S830). When the small cell which has not acquired network synchronization from external source such as GPS, the small cell first searches macro cell or controlling eNB. It may be assumed that the IP address of overlaid macro cell or controlling eNB is known to the small cell via OAM if macro cell is discovered by backhaul signaling. If air-interface discovery is used, small cell listens to the macro layer frequency to identify a macro cell. It can be assumed that the frequency to search macro cells can be preconfigured via OAM. Upon detecting multiple macro cells, via X2 signaling, small cell may determine which macro cell is an overlaid macro cell or controlling eNB. To support this, either a macro cell may advertise a list of small cell IDs that the macro cell is in charge of or the macro cell may advertise a list of small cell cluster IDs that the macro cell is in charge of. By matching either ID, a small cell can determine which macro cell is an overlaid macro cell to perform network synchronization.

If this information is known, this information can be used to determine a right source cell. Or, a small cell simply determines an overlaid macro cell based on measurement such as reference signal received power (RSRP), in other words, a macro with acceptable or highest RSRP is considered as an overlaid macro cell.

Assuming a small cell listens stratum-0 RS where a list of cell IDs which are stratum-0 are known to the small cell via X2 signaling or via OAM configuration, a small cell may choose a cell with a macro cell which is an overlaid macro cell and also signal-to-interference-plus-noise ratio (SINR) of RS from the cell exceeds a certain threshold.

To consider a case where two eNBs with same stratum level may transmit RS in the same subframe and thus collide, coordinated muting pattern may configure more than one subframes or frequencies to allow further orthogonality. Or, each eNB depending on discovered collision cases (if neighbor eNB reports the collision or high interference level at certain stratum level) may determine to skip or mute in some subframes even though those subframes are configured as the target stratum level that the given eNB is acquired to minimize the interference. Or, dynamic reconfiguration of coordinated muting pattern may be considered by overlaid macro or cluster master. To aid the reconfiguration, interference condition may be triggered or reported by eNBs.

Anyway, when a macro cell is detected/determined with the macro frequency, the small perform synchronization on the detected macro cell (S840). For the synchronization, the information such as Sync_Under_Macro_Proc may be used. It will be described later.

When a macro cell is not detected with the macro frequency, the small cell searches next frequency to locate any synchronization source (S850). If center frequency is different, the small cell performs synchronization on different frequency (S860). If center frequency is same, the small cell performs synchronization on the same frequency (S870). In this case, the information such as Sync_Under_SmallCell_Proc may be used.

Here, detailed descriptions on the three synchronizations in the example of FIG. 8 are provided.

Procedure (Sync Under Macro Proc)

Once a macro cell is detected, it can be used for clock source or source cell. Assuming macro cell transmits CRS, a small cell may use PSS/SSS and/or CRS of macro cell to acquire frequency and/or time synchronization. To allow multi-hop network synchronization, macro cell may configure a coordinated muting/transmission pattern and also configure RS type and/or configuration for network listening used in small cell layer. As mentioned above, if macro cell is far from the small cell, the macro cell may be used for frequency tracking, yet time synchronization may be performed separately (or vice versa).

In other words, even with identified overlaid macro cell, a small cell may search other small cells which are clock sources (i.e., stratum level=0). If there is no clock source available in a small cell cluster, it is also considerable to choose one or more small cells used for clock sources by the macro cell. In this case, those selected small cells may acquire time synchronization from the macro cell layer as well.

Since a small cell may need to listen on different frequency to listen on macro layer, the service may be interrupted while network RS reception is performed. Those interruptions may be performed while uplink subframes (if TDD is used) or MBSFN subframes or special subframes (if TDD is used). If MBSFN subframe is used, the small cell may transmit first two OFDM symbols and switches to macro frequency (if TDD or half-duplex FDD is used) to acquire synchronization RS.

If more than one subframes is needed to acquire sync RS, it may be assumed that eNB will not transmit any signal during RS reception. Particularly, this applies for half-duplex TDD eNB. This may impact the UE performance as eNB may not transmit necessary RS in certain subframe(s), however, with infrequent RS reception, this may not cause significant performance impact.

It could be good to listen on macro cell layer on subframes where MBSFN subframe is not configured for the macro cell (i.e., good to hear normal subframes to acquire more RS receptions).

If the target eNB has additional receiver which can listen on macro or other frequency for network listening, this interruption may not be needed to be handled. Thus, indication of capability whether additional receiver is equipped or not can be signalled so that proper coordinated muting pattern can be considered.

Or, if target eNB does not have additional receiver, to minimize service interruption, the desired subframe configuration of network listening can be signalled to source eNB to make it sure that source eNB transmits radio-interface based synchronization reference signal (RIBS-RS) in those subframes.

Or, a source eNB can send the pattern where RIBS-RS will be transmitted which is handled by source eNB by proper configuration. Alternatively, preconfigured subframe configuration can be used.

Figure 9:
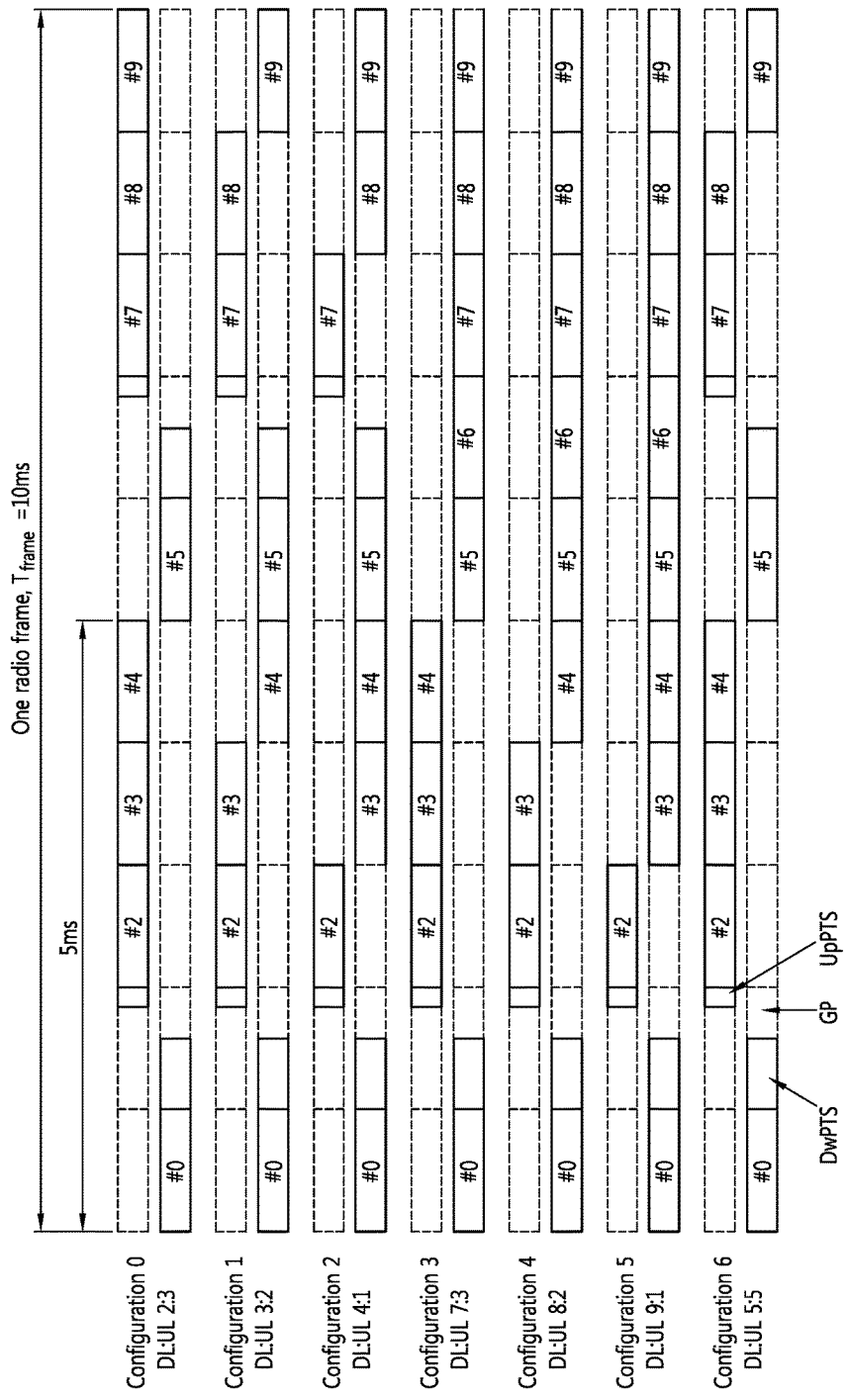
FIG. 9 is an example of downlink/uplink configuration in TDD.

FIG. 9 is an example of downlink/uplink configuration in TDD. Referring to FIG. 9, all DL/UL configurations may define subframe #2 as uplink subframe in TDD. Accordingly, subframe #2 may be used for network listening. However, this may limit the performance of uplink transmission, particularly, for DL/UL configuration 5 where only uplink subframe #2 exists. Thus, instead of subframe #2, subframe #7 can be also used which is uplink subframe in many DL/UL configurations.

Procedure (Sync Under AdjCarrier Proc)

This procedure may be similar to Sync_Under_Macro_Proc in terms of behavior. Since small cell may have higher frequency error compared to macro cell, performing both time/frequency synchronization using a source cell which is a small cell may have performance limitation. And thus, higher threshold may be used to determine a source cell.

When a macro cell is not available or any other external frequency sync source is not available, eNB may select high SINR threshold when selecting a source cell. The threshold may be predetermined via OAM or configured by X2 signaling or other signaling.

However, the SINR threshold value can be different depending on the cases. Possibly, three cases may be considered, (1) time and frequency synchronization using adjacent carrier small cell, (2) time synchronization using adjacent carrier small cell with frequency tracking via other means, (3) frequency tracking using adjacent carrier small cell with time tracking via other means.

When frequency tracking is concerned, it may be necessary to know the frequency tracking performance of source cells, which may be determined based on source cell type (e.g., macro, HeNB, pico, etc) or the information may be signaled via X2.

With lower requirement of frequency tracking in small cell eNBs (e.g., 0.5 ppm) compared to macro cell eNBs (e.g., 0.1 ppm), it is desirable to consider frequency tracking and time tracking rather separately. In other words, source cells for frequency and time tracking may be different. This applies to other procedures as well.

Procedure (Sync Under SmallCell Proc)

This procedure is used for small cells in the same frequency. Assuming there are at least a few small cells which are clock sources, small cells may acquire time and/or frequency synchronization in the same frequency via potentially multi-hop. As the synchronization accuracy per hop is tightly related to the maximum hop supported, unless configured otherwise by other means, small cell may assume maximum supportable hop is '1' when time and frequency tracking is performed based on network listening with clock source which is a small cell.

The maximum hop count can be increased to '6' if only time synchronization is performed. Other values are not precluded. Per-hop-accuracy may be determined based on the maximum hop count.

Assuming these procedures are basic procedures, the followings discuss additional backhaul signaling or procedures to handle different cases such as case 1 to case 5 as below.

Case 1: Small Cell Synchronization when Overlaid Macro Cells are not Synchronized Let's assume that small cells are (pre)configured with OAM configuration of coordinated muting pattern which is different per stratum level as illustrated in FIG. 7. As a small cell may have an associated overlaid macro cell, it can be also assumed that the patterns are configured by macro cell via backhaul signaling or other means such as new SIB.

The coordinated muting/transmission patterns may be configured differently per target accuracy and/or the maximum stratum level. Alternatively, different power for RS may be used per target accuracy and/or the maximum stratum level. For example, a macro cell may configure maximum power which can be used for transmitting RS for network listening based on the desired performance to improve SINR while keeping the same coordination pattern.

To address asynchronous macro layer, first, let's assume that the patterns are preconfigured and discuss how to determine single frequency network (SFN) alignment. When wake-up, each small cell should try to locate stratum level-0 source or macro cell. Once it successfully synchronizes itself to stratum level 0 source, it also follows SFN mapping from the stratum level 0 as well. Now, it aligns SFN with stratum level 0 source, it can start transmitting synchronization signals following the pattern.

Assuming there are two macro cells which are not aligned in SFN nor synchronized, it is possible for two small cells which have coverage overlap to acquire synchronization from each macro cell respectively and thus starting SFN and synchronization time are different. Following each macro cell, it is likely that each stratum 1 small cell eNB may transmit its signals in different subframes or different timing.

First, let's assume that two stratum 1 eNBs transmit CRS in different subframe, then two cells can discover each other and thus it detects that there is misalignment in terms of SFN. It can be determined to follow one source rather than keeping two different sources from that point. As a candidate to make a decision which one to follow, a small cell with lower cell ID may be used as a clock source for stratum level 1 or follow OAM priority to determine which one to follow.

Each small cell may propagate the cell ID of the overlaid macro cell such that macro cell ID may be used for deciding which small cell has higher priority. If two small cells transmit CRS at the same subframe, it may not be feasible for two cells to detect each other. In this case, a small cell which can hear two stratum level 1 transmissions may inform to the macro cell "conflict" signal such that stratum level 1 source cells may resolve the conflict.

Another approach is not to allow macro eNB as stratum level 0 when macro eNBs are not synchronized. In this case, it may be assumed that at least one small cell can be stratum level 0 per OAM. More specifically, a macro cell may declare itself as potential frequency synchronization source, yet, it may declare itself as non-usable time synchronization source.

To support this, additional backhaul signaling may be considered to indicate synchronization source in {time and frequency, time only, frequency only} along with stratum level and synchronous state. Alternatively, backhaul signaling can be designed to support a list of frequencies which can be used for time and/or frequency synchronization. An example may be {f1, time}, {f2, frequency} and so on.

In general, frequency tracking using different frequency such as macro frequency can be challenging particularly if macro frequency is in different band. In those cases, some other alternatives can be considered. First, frequency tracking sources may be limited to cells in the same band. If there is no identified frequency tracking source in the same band, a small cell may perform only time synchronization.

Another approach is to assign "representative" frequency clock source per band or per frequency by macro eNB or other controlling eNBs. Those cells can be used for frequency tracking where time synchronization may use different clock sources or source cells.

Another possible approach is to assume either tight frequency accuracy requirement for a small cell such that it can operate without frequency synchronization when external source for frequency tracking is not available. Overall, it is desirable to acquire frequency tracking from a common source among small cells so that frequency error among small cells can be minimized.

Figure 10:
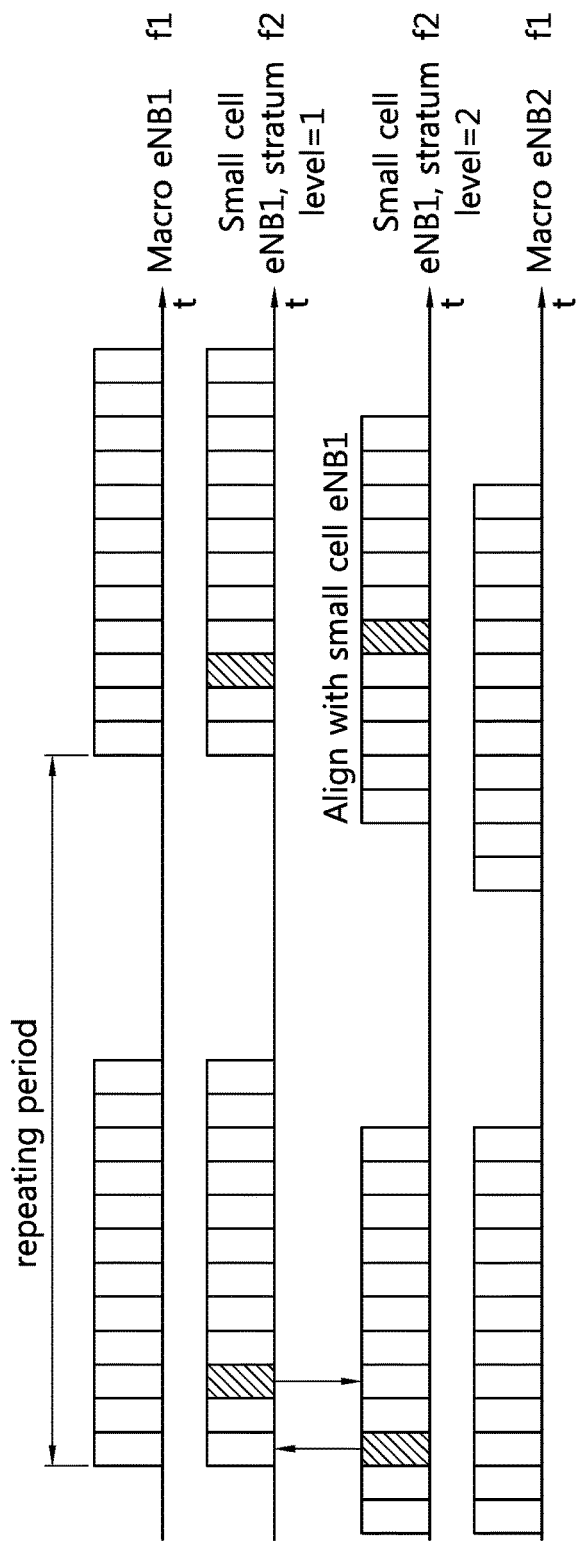
FIG. 10 is briefly showing a collision resolution when overlaid macro cells are not synchronized.

One example where the stratum level 1 small cell changes its stratum level to resolve the case where clock sources are not synchronized is shown in FIG. 10.

FIG. 10 is briefly showing a collision resolution when overlaid macro cells are not synchronized. Referring to FIG. 10, the small cell eNB2 make itself to align the small cell eNB2.

Alternatively, each small cell may be configured with a priority list which includes center frequency and optionally cell ID where the synchronization/clock source may be looked up. There could be a predetermined priority list per band and the list will be selected according to the operating band for each small cell eNB. In this case, it can be done via OAM. It searches the synchronization source according to the list. For example, as in FIG. 10, small cell eNB2 may be (pre)configured with a priority list with <f2, f1> such that it will first look up f2 for synchronization source and then move to f1 if synchronization source is not found. Or, eNB may assume to search the same frequency first unless explicitly the associated macro cell is configured. By this way, small cell synchronization when overlaid macro cells are not synchronized may be addressed.

Or, the priority list may be determined based on discovery via X2 setup. Once X2 setup is configured between macro and small cell, small cell may use macro frequency as the highest priority.

Case 2: Synchronization Among Cells which Use Adjacent Carriers

Cells using adjacent carriers may need to be synchronized. When it has clock sources which are synchronized, each cell may perform network synchronization based on network listening at each frequency.

By limiting synchronization error at each frequency less than 1.5 μs, the total synchronization error between two cells using adjacent carriers can be bounded to 3 μs. However, the lower synchronization error may not be achievable due to large propagation delay.

Assuming a scenario shown in FIG. 10, small cell eNB1 and small cell eNB2 may use adjacent carrier with f2 and f3 respectively. To minimize the performance degradation due to interference, it is desirable to synchronize SeNB1 and SeNB2.

Assuming each cell uses the overlaid as a clock source (i.e., from MeNB1 and MeNB2 respectively), then let's assume propagation delay from MeNB1 to SeNB1 is prop1 and MeNB2 to SeNB2 is prop2. The synchronization error between SeNB1 and SeNB2 may be C+(prop1?prop2)+ sync_error. Here, C may be a constant value.

To estimate or compensate the propagation delay, a few approaches can be considered. First approach is to compensate the propagation delay by estimating propagation delay. One method to estimate propagation delay is to use uplink signals from small cell eNBs such as PRACH or SRS. Or, SeNB may be requested to perform network listening in different frequency to estimate the propagation delay difference which will be reported back to the macro cell. For example, SeNB1 detects the different propagation delay between SeNB1 and SeNB2 by listening on f3.

The value will be reported back to the macro cell where each macro cell may transmit "timing adjustment" command to each small cell to compensate the timing difference. For example, let's assume that prop1 is 10 μs and prop2 is 1 μs. By listening on SeNB2, SeNB1 may detect the difference of ~9 μs which will be reported to the MeNB1. MeNB1, then, can request to TX timing of SeNB1 of 9 μs so that SeNB1 and SeNB2 can be aligned.

To support this, each small cell can be configured with a set of "measurement" frequency. Or, the list of frequency may be computed based on information exchanged via X2.

Another approach is, similar to case 1, to use the priority list such that SeNB2 may perform network synchronization by listening f2 instead of f1.

Another approach to compensate propagation delay is to use "position" information between clock source and the eNB such that the estimated propagation delay will be compensated in network synchronization. To support this, the location information of clock source and/or source cells may be exchanged either via X2 or OAM. In this case, compensation is assumed only if location information is available for the clock source. Propagation delay between small cells may be ignored assuming very small propagation latency.

This also applies to the case where macro cells are synchronized, yet, small cells within a cluster may acquire synchronization from different macro cells with different propagation delays.

Figure 11:
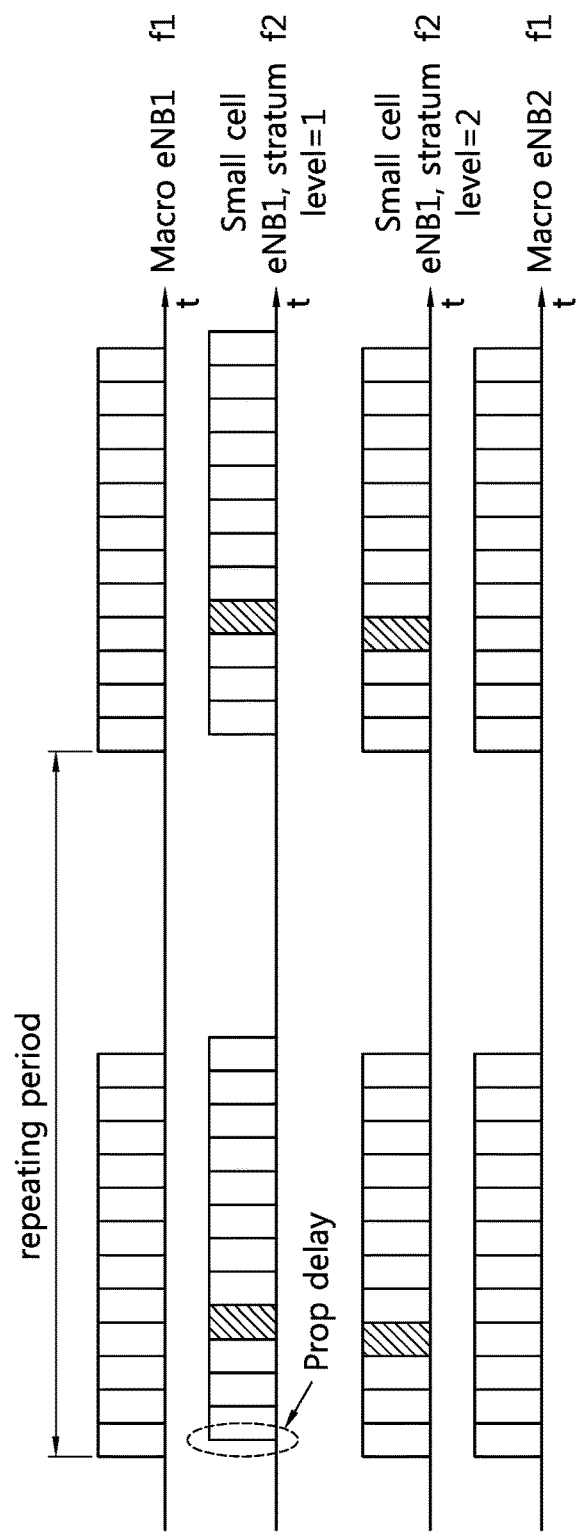
FIG. 11 briefly describes synchronization among cells in adjacent carriers with different propagation delays.

FIG. 11 briefly describes synchronization among cells in adjacent carriers with different propagation delays.

The priority list if configured or predetermined can be also used for determining TDD DL/UL configuration. For example, SeNB2 synchronizes itself against SeNB1 according to the priority list, it may also follow TDD DL/UL configuration which SeNB1 is using including intended DL/UL configuration which can be configured semi-statically. In other words, each cell may align its TDD DL/UL configuration according to TDD DL/UL configuration of the clock source or stratum level 1 small cell eNB.

Case 3: Synchronization Via Multi-Hop

As the maximum number of stratum can be different per scenario, it would be good if different muting pattern and RS transmission pattern can be specified per scenario along with per hop SINR threshold as well as the maximum stratum level supported.

For example, in a scenario where overlaid macro is assumed, it is likely that stratum level 1 or 2 may be sufficient. In this case, assuming the target accuracy is 3 μs, per-hop latency can be configured as 1.5 μs and the necessary SINR can be set, and necessary muting pattern with consideration of resource overhead can be considered and configured. Or, an eNB may be preconfigured with multiple patterns and the pattern may be determined based on per-hop SINR threshold or per-hop synchronization accuracy requirement.

This information may be propagated by the overlaid macro or clock source or a small cell via X2 signaling or OAM or new indication such as SIB transmission. When an eNB may not be able to find a source cell to meet the maximum stratum level, it may inform "out-of-sync" status to the overlaid macro cell or a small cell which is in charge of synchronization.

A mechanism to carry the information on the maximum supportable stratum level and per hop SINR or synchronization accuracy would be thus necessary.

One example is to use X2 signaling to propagate the information. Another example is to create new message (either MAC or physical layer messages) which can convey those synchronization information. Yet another example is to define different pattern for different maximum stratum level supported, and by choosing a pattern, it can indicate the maximum stratum level supported as well as per hop synchronization accuracy requirement.

The invention(s) in this disclosure provides a method for adding "maximum stratum level" and "per-hop-accuracy" or "per-hop-SINR-threshold" in X2 signaling at least from eNB which is stratum level 0 or controlling eNB.

When per-hop-SINR-threshold is assumed or configured, each eNB may take at least a few samples before determining whether received RS quality exceeds the target threshold or not. Or, network synchronization may work without configuring per-hop-accuracy or per-hop-SINR threshold. Instead, each small cell may monitor each other and estimate synchronization error among them. Once, it is detected that synchronization error is larger than the expected, it may inform to the overlaid macro or controlling eNB such that a new muting pattern can be configured to enhance the synchronization performance.

Maximum hop count or stratum level would be necessary to determine synchronous and asynchronous states. The maximum hop count may be also depending on the techniques of coordinated muting/transmitting RS or muting pattern used in the system for network listening.

In terms of determining per-hop-accuracy, one simple approach is to take linear approach such that per-hop-accuracy requirement linearly increases with the maximum supported hop count.

Alternatively, more practical approach can be also considered. For example, currently coordinated muting pattern assumes that lower stratum eNBs will be protected with muting from eNBs with higher stratum levels. In other words, SINR from lower stratum eNBs will be generally better than SNIR from higher stratum level eNBs. In practice, this is somewhat opposite to guarantee the synchronization accuracy across the multi-hop.

For example, if two eNBs acquire synchronization from 1-hop and S-hop respectively and assume that synchronization error per hop is 1 μs. Then, eNB with 1-hop synchronization achieve synchronization with 1 μs error and eNB with 3-hop achieves synchronization error of 3 μs. Thus, eNB with 3 μs error may not achieve the target synchronization accuracy.

To address this situation, per-hop synchronization accuracy should be further tightened which may affect the SINR threshold per hop and thus may increase the out-of-sync eNBs which cannot receive RS exceeding the SINR threshold.

Thus, tightening per-hop requirement may be distributed in a weighted sum fashion such that increased SINR threshold or target synchronization accuracy at stratum level 1 may be minimum and that can be increased with stratum level.

For example, to support 6 hops within 2 μs, first hop accuracy is 1 μs, second hop accuracy is 0.5 μs, third hop accuracy is 0.25 μs, and so on.

Or, in general, the target accuracy per hop at a stratum level i can be represented as $T_{accuracy}/2^{(r+1)}$ where $T_{accuracy}$ is the target accuracy such as 3 μs and r is the stratum level. For example, stratum level 1 may aim to achieve 0.75 μs, and stratum level 2 may aim to achieve 0.375 μs.

If this mechanism is used, muting should be performed more for higher stratum level as well as higher power may be used for higher stratum level. Furthermore, more subframes may be also needed per repeating period of coordinated muting where the number of subframes may increase with stratum level.

This is to enhance the reliability of tracking via multiple transmissions of RS. Thus, lower stratum level eNBs will perform muting for places which are allocated for higher stratum level eNBs transmission.

This is also practical since even though maximum hop count is assumed, in reality, lower hop count may be needed. Muting on higher stratum level eNBs transmission can be triggered only when higher stratum level eNBs are identified to minimize the overhead. In other words, a coordinated muting pattern can be assigned and muting on places used for higher stratum level eNBs can be triggered only when those eNBs are transmitting.

Another approach is to start with maximum hop count to be very small such as 2 and then each eNB performs network synchronization assuming that small maximum hop count. Once, a eNB detects there are eNBs which perform network synchronization from the stratum-level 2 (or the maximum), it detects the need of extending the maximum hop count. Then, the desirable maximum hop count such as 3 will be sent to eNBs which already performed network synchronization so that those eNBs can adjust its synchronization based on new SINR or target per-hop accuracy. This can be iteratively performed until it reaches the maximum supportable hop count.

However, if overlaid macro or controlling cell can be assumed, it is desirable to configure the maximum hop count initially and per-hop-accuracy or SINR is determined based on the hop count prior to network synchronization.

Alternatively, regardless of the maximum hop count, per-hop accuracy may be determined based on stratum level and the target accuracy. This approach however may increase a number of small cells out-of-sync by limiting per-hop accuracy requirement a bit tighter compared to the case where the maximum hop count is very small (e.g., 1 or 2).

Case 4: Synchronization with Consideration of Small Cell on/Off

When a cell employs cell on/off, it may shut off transmission in some period. Furthermore, a new discovery signal may be designed to support efficient on/off procedure. Thus, when on/off is employed, there could be multiple options in terms of choice of RS used for network synchronization.

At initial network synchronization, assuming no cell on/off, PSS/SSS/CRS may be used for network synchronization with coordinated muting patterns. Once, each eNB is initialized and synchronized, to maintain and update network synchronization, discovery signals may be used instead of PSS/SSS/CRS if discovery signal is different from PSS/SSS/CRS.

Furthermore, instead of utilizing coordinated muting pattern, discovery signal transmission pattern may also be used for network synchronization. In this case, a new muting pattern covering discovery signal transmission and reception for eNBs may be needed additionally.

Alternatively, by triggering from a small cell or overlaid macro cell, each small cell with cell on/off operation may transmit CRS for network listening according to configured muting patterns one or a few rounds upon triggering.

Furthermore, efficient discovery signal transmission to support on/off may also rely on tighter synchronization among small cells. For example, the synchronization accuracy becomes lower such as 1 us compared to 3 μs. In this case, with keeping the same maximum stratum level, per-hop accuracy becomes smaller and thus target SINR per hop also increases.

If network listening uses CRS regardless of discovery signal, the collision between CRS for network listening and discovery signal may be occurred. It is thus desirable to use discovery signal if discovery signal and CRS may collide in any subframe. Otherwise, it is desirable to use CRS regardless of on/off state and discovery signal.

Case 5: Synchronization with Consideration of eIMTA

When enhanced interference mitigation and traffic adaptation (eIMTA) is used, to allow maximum flexibility, it is likely that TDD DL/UL configuration with UL heavy can be signaled via SIB. Before any DL/UL configuration is fixed, a small cell can transmit RS for network listening according to coordinated muting/RS transmission pattern. However, once DL/UL configuration is fixed and it starts to serve UEs, it is likely that the subframe assigned to RS transmission for network listening may be uplink subframe.

Figure 12:
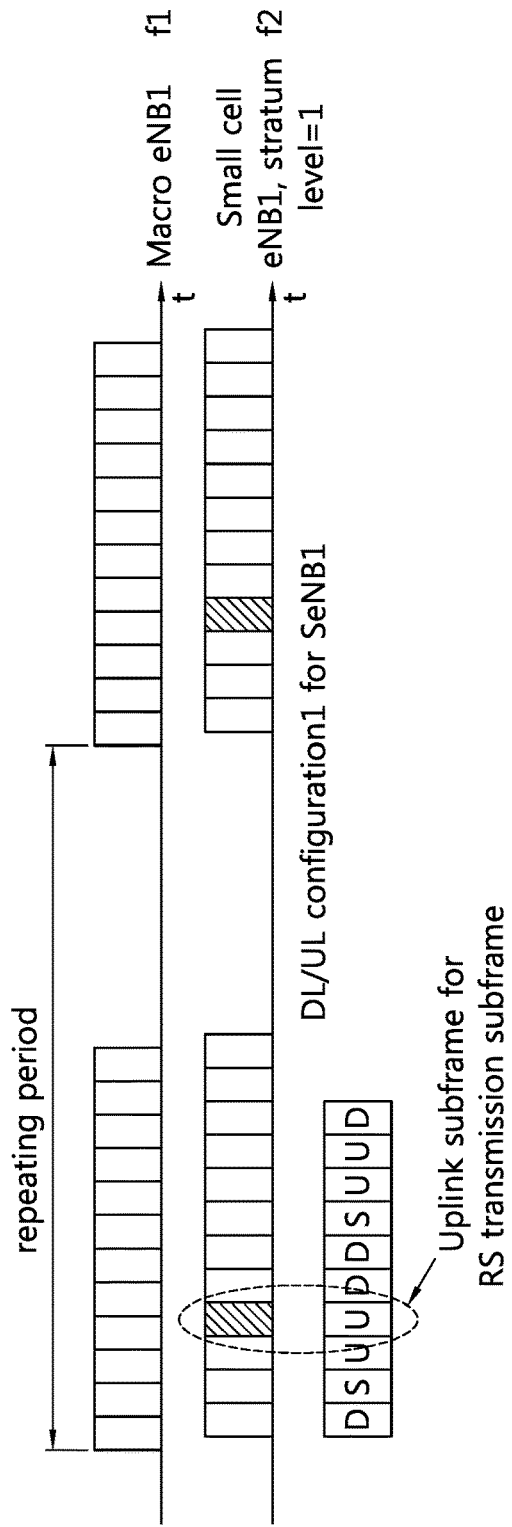
FIG. 12 briefly describes an example of RS transmission according to the invention.

FIG. 12 briefly describes an example of RS transmission according to the invention(s) of this disclosure. An example of FIG. 12 shows RS is transmitted at uplink subframe (the dashed 4th subframe) in downlink/uplink configuration 1 for small cell eNB1.

As shown in the example of FIG. 12, if configuration 1 is selected for SeNB1, it is likely that a subframe where RS transmission is scheduled for network listening may be uplink subframe. To handle this situation, a few approaches such as (a)~(d) can be considered as below.

(a) Always transmitting RS in configured subframes for network listening: Regardless of configuration and state, RS can be transmitted in configured subframes for network listening. Triggering transmission can be enabled or disabled by macro eNB or controlling eNB. If this approach is used, if RS transmission is performed in an uplink subframe, to allow DL-UL switching after transmitting RS, it may be assumed that a last few symbols would not carry RS. It may be assumed that only first two OFDM symbols or OFDM symbols in first slot (according to MBSFN configuration) carry RS if RS transmission occurs in a UL subframe according to the configuration (either by SIB-signaled DL/UL configuration or by intended DL/UL configuration or both).

(b) Transmitting RS only in DL subframes per SIB-signaled DL/UL configuration: In this case, periodic or update of network listening RS may not be available from eNBs if configured subframes are uplink subframes.

(c) Transmitting RS only in DL subframes per SIB-signaled DL/UL configuration or intended DL/UL subframe configuration signaled via X2: If intended DL/UL subframe configuration exists, DL subframes following either configuration will transmit RS signals (d) No coordinated muting when small cell serves UEs: It may be assumed that network listening occurs only when small cells are not serving UEs. With this approach, when a new small cell is initialized, other small cells may need to detach UEs for performing network synchronization. This is however inefficient as it may not allow updates of synchronization and thus lead higher synchronization error over time.

Note that a small cell may perform frequency synchronization and time synchronization separately. In other words, the small cell may use external interface or other means for frequency synchronization and use network listening for time synchronization. The small cell may also use macro cell for frequency synchronization and other small cells for time synchronization.

Alternatively, when coordinated muting is used in TDD, only uplink subframe may be used as coordinated muting. In this case, the impact on UE can be reduced as it does not require any configuration of MBSFN SF. Since, always second #2 is uplink subframe in TDD configurations, it may be assumed that coordinated muting will be occurred only in #2 along with muting.

Interference from PUCCH may be okay or assuming potential interference from PUCCH from UE, only center 6 PRB CRS may be transmitted and/or used for network listening. If this is used, stratum level may be determined by the SFN where transmission occurs and potentially SFN-ed transmission can be also feasible.

In this case, MBSFN-RS may be used for network listening where RS can be scrambled with cluster ID so that CDM between small cell clusters can be achieved. One example is shown in FIG. 13.

Figure 13:
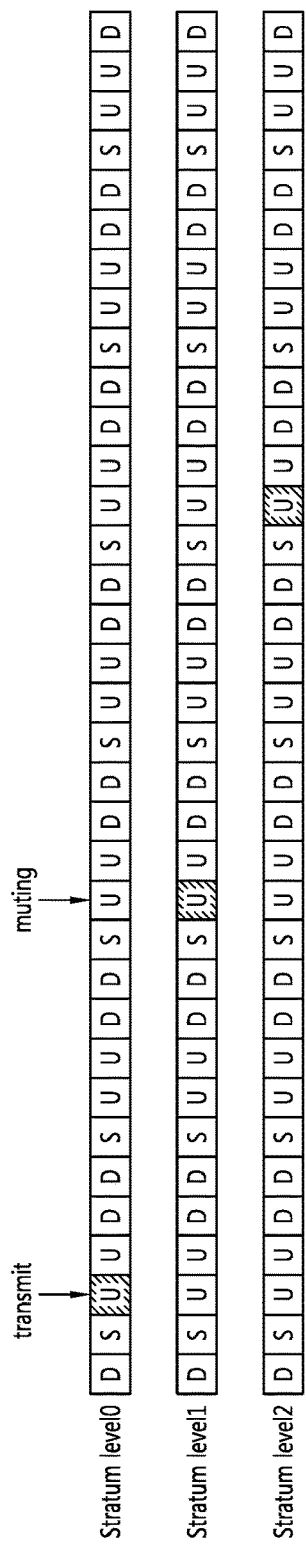
FIG. 13 briefly shows an example of muting pattern according to stratum level.

FIG. 13 briefly shows an example of muting pattern according to stratum level. Referring to FIG. 13, at the stratum level 0, RS is transmitted at uplink subframes in first radio frame while there are muted uplink subframes in second and third radio frames. At stratum level 1, RS is transmitted at uplink subframes in second radio frame whereas there are muted uplink subframes in first and third radio frames. At stratum level 2, RS is transmitted at uplink subframes in first radio frame while there are muted uplink subframes in second and third radio frames. Thus, there is no collision between RS transmissions among different stratum levels.

As an example of MBSFN-RS scrambling, MATH 1 may be used.

$$c_{init} = 2^9 \cdot (7 \cdot (SFN+1) + I + 1) \cdot (2 \cdot N_{ID}^{CLUSTER} + 1) + N_{ID}^{CLUSTER} \qquad <\text{MATH 1}>$$

By reading MBSFN-RS, each eNB may determine whether the RS comes from the same cluster or not and the RS can be used for determining whether RS is usable or not. SFN may be used for clock source if SFN alignment cannot be assumed. Similar scrambling (using cluster ID instead of cell ID) can be considered with other signals as well. Furthermore, PSS/SSS-based network listening in those subframe can be considered where PSS/SSS may carry either stratum level or cluster ID or a hybrid of both.

TDD Handling

There are two main mechanisms to implement coordinated muting in TDD, namely using MBSFN configuration and guard period (GP) configuration. When guard period is used, it has limitation that one or maximum two stratum levels are supported due to limited resource in guard period whereas the overhead is relatively high. Thus, further consideration how to utilize guard period to realize higher stratum level is needed. As these consideration, coordinated muting patterns via MBSFN and guard period are provided as below.

1) Coordinated muting pattern via MBSFN: The case that clock source uses DL/UL configuration 0 is considered. It may not be likely, yet, there is a possibility that clock source or donor eNB uses DL/UL configuration 0 to employ dynamic DL/UL configuration (eIMTA).

In this case, MBSFN based approach may not work as subframes usable for the eNB are limited to #0/#1/#5/#6 which are not configurable as MBSFN and thus other eNBs may not be able to perform muting except for configuring different guard period. For this, per coordinated muting pattern, even if the current subframe is an uplink subframe, donor eNB may transmit RS.

To allow switch between DL↔UL, last OFDM symbol may not be used for network listening purpose. The technique mentioned with consideration of eIMTA is equivalent.

However, if macro cell uses configuration 0, muting on subframe #0 or subframe #5 may be needed. This may impact legacy UEs, yet, indication of muting in those subframes can be signaled to advanced UEs for better performance.

2) coordinated muting pattern via guard period: When coordinated muting is used via guard period, one example is to configure different guard period for each stratum level.

Figure 14:
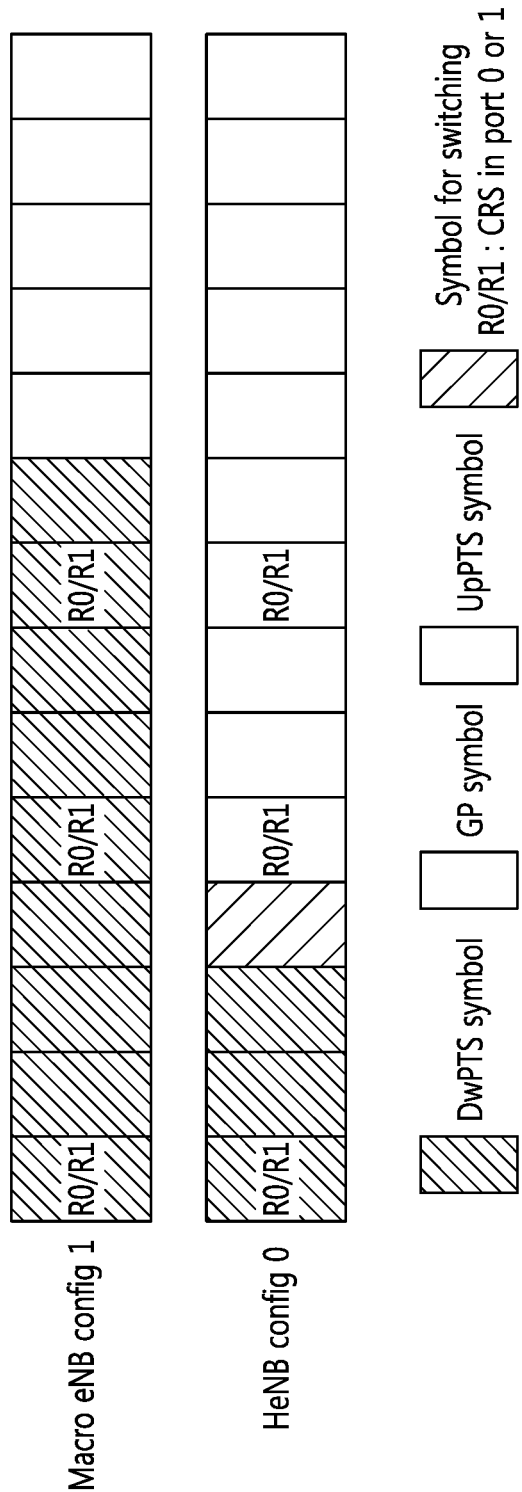
FIG. 14 briefly describes an example of muting pattern via guard period.

FIG. 14 briefly describes an example of muting pattern via guard period. There are a few issues as follows with this approach. The invention(s) in this application provides possible solutions to address those issues. Referring to FIG. 14, issues and the possible solution are described as below.

(A) Different configuration between the needed and the actual: One problem with this approach is that actual guard period may not be the same as the needed guard period configuration. For example, as in FIG. 14, macro eNB may need configuration 0 whereas the actual configuration to support network synchronization is configuration 1.

In this case, MeNB may use configuration 1 occasionally for network listening. To support this, coordination of subframes used for network listening is needed. For example, every 10 seconds, first radio frame is used for network listening transmission for stratum level #0, second radio frame is used for network listening transmission for stratum level #1 (or first radio frame for stratum level #0 and #1 by using different GP configuration) and so on.

Thus, backhaul signaling to coordinate the pattern or predetermined pattern is needed. In terms of configuration of GP, regardless of actual GP, the used GP for network listening may be exchanged via backhaul or predetermined.

For example, MeNB may use configuration #0, yet, it may report configuration #1 for network listening purpose via backhaul or prefixed. When eNB uses different GP configuration for network listening, it may impacts the UE, particularly when it uses shorter GP than the actual GP configuration (e.g., configuration #1 compared to configuration #0) due to uplink timing advance.

The network may handle this by not scheduling uplink transmission or by ignoring uplink transmission occurred by those UEs. On the other hand, if the network needs to use long GP for network listening than the actual, it also impacts the UE performance as it may not transmit the expected CRS.

The PDCCH reception in those subframes would be impacted. In this case, the network may inform the advanced UEs with new GP configuration so that it can prepare proper handling of such cases.

(B) Different CP: Another issue is the case when different eNB uses different cyclic prefix (either normal or extended). In this case, only one stratum level may be conveyed per subframe as it may not easy to configure two different GP to contain CRS transmission. Or, depending on the selection, more stratum can be configured as well.

To be safe, if this is assumed, only one configuration may be used to convey one stratum level. It may be considered to align CP in network listening period same as to that of clock source. If network listening performing eNB may use different CP, it may configure long GP and transmits CRS according to clock source CP for other eNBs for network listening.

For example, if one eNB uses normal CP whereas the clock source uses extended CP, the eNB uses extended CP while processing and transmitting RS for network listening.

Table 2 shows an example of GP configuration (DwPTS/GP/UpPTS) configuration.

TABLE 2

| | Normal CP | | | Extended CP | | |
|---|---|---|---|---|---|---|
| Config | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |

In Table 2, DwPTS and UpPTS represent downlink part and uplink part in special subframe.

This is not limited to guard period. In general, if donor eNB and target eNB can use different CP, thus, blind detection of CP is needed or X2 signaling of CP is needed.

(C) Multiple stratum levels: Due to the limited number of GP configurations, only one or two stratum levels can be represented per subframe. Thus, to convey more stratum levels, it is also necessary to utilize either frequency or time.

For example, stratum level 0/1 shares the same subframe and frequency location with different GP configuration and stratum level 2/3 do the same, and so on. Or, stratum levels can be conveyed via subframe as well. It can be used jointly between coordinated muting subframe pattern per stratum level with GP.

Figure 15:
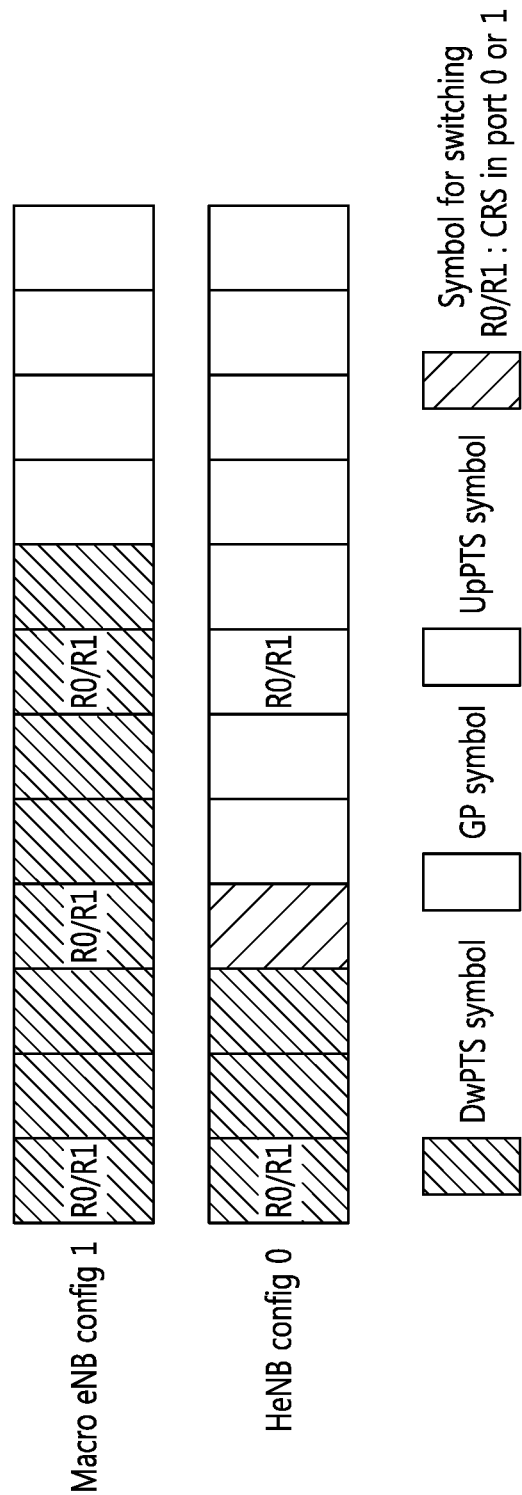
FIG. 15 show another example of a configuration with special subframes.

FIG. 15 show an another example of a configuration with special subframes. The special subframe may comprising DwPTS, GP, and UpPTS.

In terms of configuring GP when GP is used for network listening, it can be considered to assign the shorted DwPTS for all UEs where advanced UEs can assume that DM-RS based PDSCH can be scheduled when PDCCH is detected in special subframe to minimize the overhead.

Or, if the UE detects PDCCH, it may assume that PDSCH will be transmitted in special subframe regardless of DwPTS configuration. If the UE is configured with EPDCCH and the special subframe is configured for EPDCCH monitoring, and EPDCCH is detected, the UE can assume that DwPTS is longer than the configured.

For the size of DwPTS, a UE can be configured with separate DwPTS configuration which is different from SIB-signalled DwPTS configuration. A UE may assume that higher-layer configured DwPTS becomes effective when (E)PDCCH is detected. In terms of EPDCCH detection, a UE shall assume that CRS may not be present in PDSCH region, in other words, CRS transmission may be based on SIB-signalled DwPTS configuration for (E)PDCCH detection. Once, (E)PDCCH detection is accomplished, a UE may utilize the CRS transmission in PDSCH region.

Handling of Reaching "Maximum Supportable" Stratum Level

When a eNB acquires network synchronization and the determined stratum level reaches the maximum supportable stratum level in the network, whether this eNB transmits RIBS-RS or not needs some consideration. If it transmits RIBS-RS, and potentially some other eNBs (which are not synchronized yet) may detect the signal, the achievable synchronization error in those eNBs based on the source eNB whose stratum level already reaches the maximum level may not be desirable.

However, if the eNB does not transmit RIBS-RS, it may be that some eNBs cannot find any synchronization source node. Accordingly, it is overall desirable to transmit RIBS-RS even though it already reaches the maximum supported stratum level. Thus, the maximum stratum level and stratum level carried in X2 signaling or RIBS-RS can be different and in general stratum level carried in X2 signaling or RIBS-RS should be larger than the maximum stratum level supported.

When a eNB synchronizes itself against donor eNB with the maximum stratum level or higher stratum level than the maximum stratum level, it can utilize the information for a rough synchronization. Moreover, this eNB may indicate to the overlaid macro or cluster head about the situation so that some other rearrangement or reconfiguration of network listening topology can be considered.

In a case where this eNB sees more than two donor eNBs whose timing may be different, then this eNB may maintain multiple synchronization information where different synchronization may be used per subframe set basis.

For example, if two clusters are adjacent and one eNB is between two clusters where two clusters are not aligned in timing, the eNB may determine itself to follow either cluster to serve UEs belonging to each cluster respectively.

Another example is that when overlaid macro cell is not synchronized and an eNB sees two macro cells, then it may configure different timing per subframe set which can be used for serving UEs connected with each macro cell. This can be signalled to UE so that UE can perform proper tracking using proper set of subframes. Or, restricted measurement subframe configuration can be used to indicate usable subframes for time/frequency tracking per UE.

Figure 16:
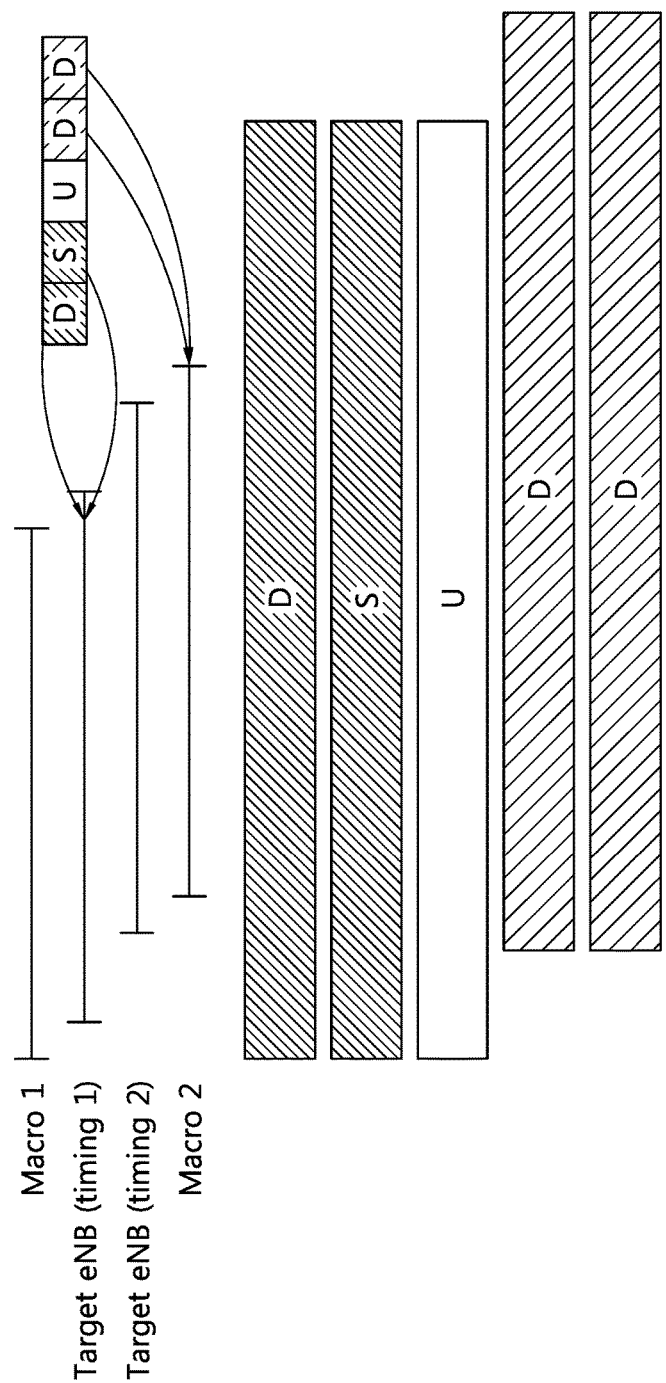
FIG. 16 briefly describes an example that different timings for subframe sets are configured.

FIG. 16 briefly describes an example that different timings for subframe sets are configured. Referring to FIG. 16, timing 1 and timing 2 are configured for different subframe sets.

Semi-Synchronous eNBs:

When network listening is used, there are cases where a target eNB may be able to listen to RIBS-RS which may not satisfy the desired SINR or desired stratum level.

For example, if a target eNB is able to listen to a source eNB with maximum stratum level defined, the target eNB may not be able to claim itself as synchronized even though a rough synchronization can be achieved via the source eNB.

Another example is when a target eNB listens to low quality of RIBS-RS which may not guarantee the achievable synchronization accuracy, the target eNB may be able to synchronize itself, though, it may not be claiming as a potential source eNB for some other target eNBs.

Thus, a new state "semi-synchronous" can be considered which defines that a eNB is roughly synchronized and thus the requirement may not be satisfied and it may not be usable as a source eNB. If there are many semi-synchronous eNBs in the network, proper configuration of guard period or using extended CP may be applied.

Thus, it is better than saying 'asynchronous'. Or, a stratum level (such as maximum stratum level+1) can be reserved to state such eNBs which may transmit RIBS-RS in case there are other target eNBs with no source eNBs. Target eNB synchronized with those loosely synchronized source eNBs also define itself as semi-synchronous as well.

Figure 17:
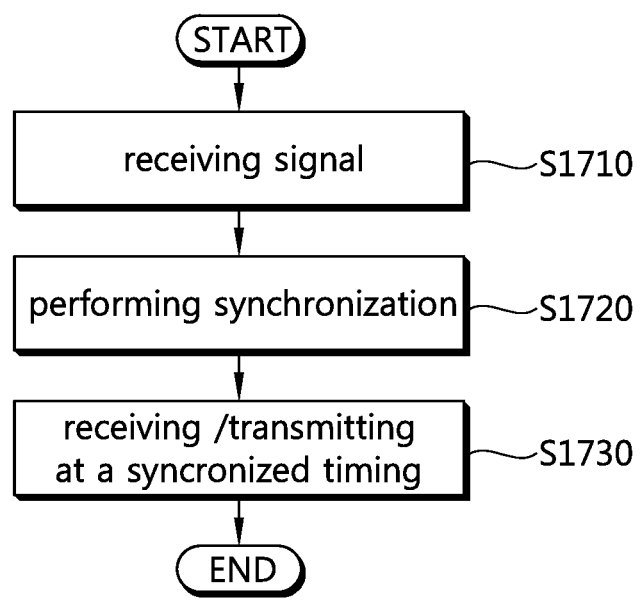
FIG. 17 is a flow chart briefly describing the operation of the inventions.

FIG. 17 is a flow chart briefly describing the operation of the inventions explained above.

Referring to FIG. 17, the cell, which is woke up and need to synchronize, receives signal (S1710). The received signal may include information indicating signalling timing for a reference signal which can be used in network synchronization as described before. The reference signal may be one of CRS, CSI-RS, PSS and/or SSS, DM-RS, and MBSFN-RS.

Once the information indicates the timing to transmit a reference signal for the network synchronization, the reference signal for the network synchronization may be signalled at the timing regardless whether the cell is in off state or in on state.

In addition, the received signal may include information indicating which cell has a priority for the synchronization.

Further, the signal may be received in guard period of special subframe.

The cell may perform synchronization using the received signal (S1720). Synchronization may be performed using the reference signal one of CRS, CSI-RS, PSS and/or SSS, DM-RS, and MBSFN-RS. When the woken up cell received reference signal, the cell may perform synchronization considering priority which is predetermined or considering stratum level. The detailed operations of synchronization are same as described before.

The cell may receive and/or data with the synchronized timing (S1730).

Figure 18:
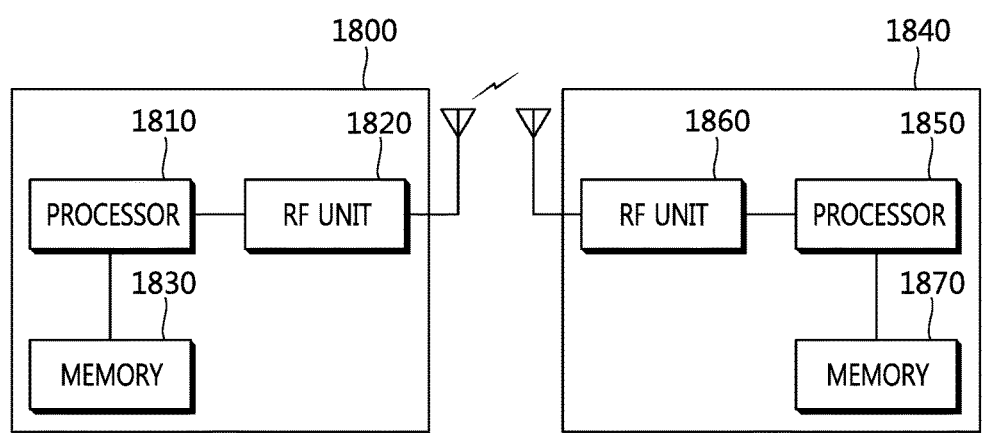
FIG. 18 is a block diagram which briefly describes a wireless communication system.

FIG. 18 is a block diagram which briefly describes a wireless communication system including a first BS (eNB) 1800 and a second BS (eNB) 1840.

The first BS 1800 and the second BS 1840 may operate based on the description as explained above. For example, the first BS 1800 may be a BS which woke up and needs to synchronize with other cells. In other words, the first BS 1800 may be a BS to perform network synchronization. The second BS 1840 may be a BS which transmits signal, which is needed for synchronization, to the first BS 1800.

The first BS 1800 may be a small cell and the second BS may be a macro cell.

The first BS 1800 comprises a processor 1810, a radio frequency (RF) unit 1820, and a memory 1830.

The processor 1810 performs network synchronization process described above. For example, the processor 1810 may perform network synchronization using reference signal such as at least one of CRS, CSI-RS, PSS and/or SSS, DM-RS, and MBSFN-RS. The detailed process performed by processor 1810 is same as described above.

The RF unit 1820 may receive signals including at least one of information indicating transmission timing of reference signal for synchronization, reference signal for synchronization such as one of at least one of CRS, CSI-RS, PSS and/or SSS, DM-RS, and MBSFN-RS, system information block (SIB), information indicating cell priority for synchronization, stratum level, etc.

The RF unit 1820 may receive and/or transmit signals at the synchronized timing.

The memory 1830 may store information and data needed for synchronization and wireless communication.

The second BS 1840 may include a processor 1850, a RF unit 1860, a memory 1870.

The processor 1850 performs what described in this disclosure for network synchronization process. For example, the processor 1850 may determine timing of transmitting reference signal, priority for synchronization between cells, etc. In addition, the processor 1850 may indicate its own stratum level by the signal through the RF unit 1860. The processor 1850 may construct reference signal for the synchronization. The detailed operation of the processor 1850 is same as described before.

The RF unit 1860 may transmit information indicating transmission timing of reference signal for synchronization, reference signal for synchronization such as one of at least one of CRS, CSI-RS, PSS and/or SSS, DM-RS, and MBSFN-RS, system information block (SIB), information indicating cell priority for synchronization, stratum level, etc.

The reference signal for synchronization may be transmitted at the timing indicated before regardless whether the cell is on state or off state.

The memory 1870 may store information and data needed for synchronization and wireless communication.

The detailed descriptions for the BSs are same as described before with or without figures.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method of performing a synchronization by a small cell based on network listening, the method comprising:
   determining, by the small cell, whether the synchronization with an external source can be performed;
   when it is determined that the synchronization with the external source cannot be performed, searching a macro frequency, by the small cell, for a macro cell;
   determining, by the small cell, whether the searched macro cell is an overlaid macro cell to perform the synchronization;
   receiving a reference signal for the synchronization to the overlaid macro cell;
   when the searched macro cell is determined as the overlaid macro cell, performing, by the small cell, the synchronization to the overlaid macro cell based on the reference signal for the synchronization;
   when the overlaid macro cell is not detected, searching, by the small cell, a frequency other than the macro frequency to locate any synchronization source, and performing the synchronization,
   wherein the synchronization is performed using a synchronization under adjacent carrier procedure when a center frequency is different from the other frequency, and the synchronization is performed using a synchronization under small cell procedure, which uses small cells with the same frequency when the center frequency is the same as the other frequency; and
   receiving and/or transmitting, by the small cell, data at a timing based on the synchronization,
   wherein the reference signal for the synchronization is one of a cell-specific common reference signal (CRS), a channel-state information reference signal (CSI-RS), a primary synchronization signal (PSS), a secondary synchronization signal (SSS), a demodulation reference signal (DM-RS), a multimedia broadcast single frequency network reference signal (MBSFN-RS), and a positioning reference signal (PRS).

2. The method of claim 1, wherein the reference signal for the synchronization is signaled in a subframe configured for the network listening regardless of a state or configuration of the small cell.

3. The method of claim 1, wherein a signal indicates a timing for signaling the reference signal for the synchronization; and the small cell receives the reference signal for the synchronization at the indicated timing.

4. The method of claim 3, wherein the reference signal for the synchronization is signaled at the indicated timing regardless of a cell on/off state.

5. The method of claim 1, wherein a signal indicating priorities between small cells for the synchronization is received, and the synchronization to a small cell with the highest priority is performed first.

6. The method of claim 5, wherein the priorities between the small cells are indicated by a priority list or a backhaul signaling.

7. The method of claim 5, wherein the priorities between the small cells are signaled from the macro cell.

8. The method of claim 1, wherein the reference signal for the synchronization is received at a guard period of a special subframe.

9. The method of claim 1, wherein the synchronization is performed based on stratum levels of cells.

10. The method of claim 9, wherein the small cell performs the synchronization using the reference signal with a lower stratum level than a stratum level of the small cell.

11. The method of claim 9, wherein a frequently repeated number of the reference signal is determined based on a stratum level of the reference signal.

12. An apparatus of performing a synchronization based on network listening, the apparatus comprising:
    a radio frequency (RF) unit for transmitting and receiving a radio signal; and
    a processor operatively coupled to the RF unit, that:
    controls the RF unit to transmit signals based on a scheduling for uplink and/or downlink,
    determines whether the synchronization with an external source can be performed;
    when it is determined that the synchronization with the external source cannot be performed, searches a macro frequency for a macro cell;
    determines whether the searched macro cell is an overlaid macro cell to perform the synchronization;
    controls the RF unit to receive a reference signal for the synchronization to the overlaid macro cell;
    when the searched macro cell is determined as the overlaid macro cell, performs the synchronization to the overlaid macro cell based on the reference signal for the synchronization;
    when the overlaid macro cell is not detected, searches a frequency other than the macro frequency to locate any synchronization source, and performing the synchronization,
    wherein the synchronization is performed using a synchronization under adjacent carrier procedure when a center frequency is different from the other frequency, and the synchronization is performed using a synchronization under small cell procedure, which uses small cells with the same frequency when the center frequency is the same as the other frequency; and
    controls the RF unit to receive and/or transmit data at a timing based on the synchronization,
    wherein the reference signal for the synchronization is one of a cell-specific common reference signal (CRS), a channel-state information reference signal (CSI-RS), a primary synchronization signal (PSS), a secondary synchronization signal (SSS), a demodulation reference signal (DM-RS), a multimedia broadcast single frequency network reference signal (MBSFN-RS), and a positioning reference signal (PRS).

13. The apparatus of claim 12, wherein the RF unit receives a signal indicating a timing for signaling the reference signal for the synchronization, and receives the reference signal for the synchronization at the indicated timing.

14. The apparatus of claim 12, wherein the RF unit receives a signal indicating priorities between small cells for the synchronization, and wherein the processor performs the synchronization to a small cell with the highest priority is performed first.

* * * * *